United States Patent [19]
Dennis

[11] Patent Number: 4,814,978
[45] Date of Patent: Mar. 21, 1989

[54] DATAFLOW PROCESSING ELEMENT, MULTIPROCESSOR, AND PROCESSES

[75] Inventor: Jack B. Dennis, Belmont, Mass.

[73] Assignee: Dataflow Computer Corporation, Boston, Mass.

[21] Appl. No.: 885,836

[22] Filed: Jul. 15, 1986

[51] Int. Cl.[4] .................. G06F 13/00; G06F 15/00
[52] U.S. Cl. ................................ 364/200; 364/900
[58] Field of Search ............................. 364/200, 900

[56] References Cited

U.S. PATENT DOCUMENTS

| | | |
|---|---|---|
| 3,962,706 | 6/1976 | Dennis et al. . |
| 3,978,452 | 8/1976 | Barton et al. . |
| 4,112,489 | 9/1978 | Wood . |
| 4,128,882 | 12/1978 | Dennis . |
| 4,130,885 | 12/1978 | Dennis . |
| 4,145,733 | 3/1979 | Misunas et al. . |
| 4,149,240 | 4/1979 | Misunas et al. . |
| 4,153,932 | 5/1979 | Dennis et al. ............... 364/200 |
| 4,156,903 | 5/1979 | Barton et al. . |
| 4,156,908 | 5/1979 | Missios et al. . |
| 4,156,909 | 5/1979 | Barton et al. . |
| 4,156,910 | 5/1979 | Barton et al. . |
| 4,187,539 | 2/1980 | Eaton . |
| 4,197,589 | 4/1980 | Cornish et al. ............... 364/900 |
| 4,236,206 | 11/1980 | Strecker et al. . |
| 4,245,299 | 1/1981 | Woods et al. . |
| 4,251,861 | 2/1981 | Mago . |
| 4,254,476 | 3/1981 | Burrows . |
| 4,271,480 | 6/1981 | Vinot . |
| 4,390,969 | 6/1983 | Hayes . |
| 4,413,318 | 11/1983 | Herrington ............... 364/200 |
| 4,447,875 | 5/1984 | Bolton et al. . |
| 4,467,409 | 8/1984 | Potash et al. . |
| 4,475,156 | 10/1984 | Federico et al. . |
| 4,502,118 | 2/1985 | Hagenmaier, Jr. et al. . |
| 4,591,979 | 5/1986 | Iwashita ............... 364/200 |
| 4,644,461 | 2/1987 | Jennings ............... 364/200 |
| 4,675,806 | 6/1987 | Uchida ............... 364/200 |

FOREIGN PATENT DOCUMENTS

| | | |
|---|---|---|
| 1449542 | 3/1962 | Fed. Rep. of Germany . |
| 1074776 | 7/1974 | Japan . |
| 1948959 | 6/1959 | United Kingdom . |
| 1029571 | 5/1966 | United Kingdom . |
| 1115765 | 5/1968 | United Kingdom . |
| 1314393 | 4/1973 | United Kingdom . |
| 1442459 | 7/1976 | United Kingdom . |

OTHER PUBLICATIONS

Jenkins, Richard A., "Supercomputers of Today and Tomorrow", Tab Books Inc., Blue Ridge Summit, Pa., 1986, pp. 92-94.
Reisig, Wolfgang, "Petri Nets", Springer-Verlag, Berlin, Heidelberg, New York, 1982, Chapters 1 and 3.
Hwang, Kai and Briggs, Fayé A., "Computer Architecture and Parallel Processing", McGraw Hill, Inc., N.Y., 1984, Sections 10.1 and 10.2.
Ackerman, W. B., Dennis, J. B., VAL—A Value-oriented Algorithmic Language, M.I.T., Cambridge, MA, Jun. 1979.
Cornish, M., The TI Data Flow Architectures: The Power of Concurrency for Avionics, Dataflow Dev. Group of Texas Instruments, Inc., Austin, Texas, Nov. 1979.
Dennis, J. B., Stoy, J. E., Guharoy, B., VIM: An Experimental Multi-user System Supporting Functional Programming, M.I.T., Cambridge, MA, May 1984.
Dennis, J. B., Misunas, D. P., A Preliminary Architecture for a Basic Data Flow Processor, M.I.T., Cambridge, MA, Aug. 1984.
Gao, G. R., An Implementation Scheme for Array Operations in Static Data Flow Computers, M.I.T., Cambridge, MA, May 1982.
Gostelow, A. & Gostelow, K. P., A Computer Capable of Exchanging Processors for Time, University of California, Irvine, California-1977.
Gurd, J. R., Kirkham, C. C., Watson, I., The Manchester Prototype Dataflow Computer, Communications of the ACM, vol. 28, No. 1, Jan. 1985.
Patil, S. S., Closure Properties of Interconnections of Determinate Systems, M.I.T., Cambridge, MA, 1970.
Van Horn, E. C., Computer Design for Asynchronously Reproducible Multiprocessing, M.I.T., Cambridge, MA, Nov. 1966.
Watson, I. & Gurd, J., A Practical Data Flow Computer, University of Manchester, Manchester, England, Feb. 1982.
Yuba, T., Shimada, T., Hiraki, K. and Kashiwagi, H., A Dataflow Computer for Scientific Computations, Electrotechnical Laboratory, 1-1-4 Umesono, Sekyramura, Niiharigun, Ibaraki 305, Japan-1984.

Ackerman, W. B., *Data Flow Languages*, MIT CSG Memo 177-1, M.I.T. Cambridge, Mass., May 1979.

Ackerman, W., Bauman, H., Woodhall, B., *Static Data Flow Cell Block*, M.I.T. CSG Memo 232, Nov. 4, 1983.

Ackerman, W. B., *The VAL Intermediate Graph Format*, M.I.T. CSG Memo 235, Jan. 12, 1984.

Adams, G. B., III, et al, *Report on an Evaluation Study of Data Flow Computation*, Research Inst. for Advanced Computer Science, NASA, Apr., 1985.

Arvind, Kathail, V., A Multiple Processor Dataflow Machine, MIT CSG Memo 205-1, Feb. 1981.

Arvind, *Functional Languages and Architecture*, Progress Report for 1983-1984, M.I.T., Dec. 8, 1984.

Arvind, Ianucci, R. A., *Two Fundamental Issues in Multiprocessing: The Da taflow Solution*, M.I.T. CSG Memo 226-2, Jul. 27, 1983.

Tam-Auh Chu, *The Design, Implementation and Testing of a Self-Timed Two by Two Routes*, M.I.T. CSG Memo 236, Feb. 1983.

Dennis, J. B., *Dataflow Ideas for Supercomputers*, Proceedings of the Comp. Con. '84, 28th IEEE Computer Soc. Int., Feb. 27-Mar. 1, 1984.

Dennis, J. B., *Progress Report 1979-80*, MIT CSG Memo 203, Feb. 1981.

Dennis, J. B., *Data Flow Supercomputers*, M.I.T., Cambridge, Mass., Nov. 1980.

Dennis, J. B., *High Performance Dataflow Computers*, M.I.T. Cambridge, Mass., CSG Memo 215, Mar. 1982.

Dennis, J. B. et al., *The MIT Dataflow Engineering Model*, M.I.T., Cambridge, Mass., CSG Memo 222, Nov. 1982.

Dennis, J. B., *Data Flow Models of Computation*, International Summer School on Control Flow and Dataflow; Markteberdorf, Germany, Aug. 1984.

Dennis, J. B., Rong, Gao Guang, *Maximum Pipelining of Array Operations on Static Data Flow Machine*, M.I.T. CSG Memo 233, Sep. 1984.

Dennis, J. B., *An Operational Semantics for a Language with Early Completion Data Structures*, MIT CSG Memo 207, Nov. 23, 1984.

Dennis, J. B., *Computational Structures Progress Report for 1983-1984*, M.I.T. CSG Memo 246, Feb. 28, 1985.

Gao, G. R., *A Maximally Pipelined Tridiagonal Linear Equation Solver*, M.I.T. CSG Memo 254, Jun. 1985.

McGraw, J. R., *Data Flow Computing-The VAL Language*, M.I.T., Cambridge, Mass., CSG Memo 188, Jul. 1980.

Montz, L., *Safety & Optimization Transformation for Dataflow Programs*, M.I.T., Feb. 1980.

NEC Electronics, Inc., $\mu PD$ *7281 Image Pipelined Processor*, Feb. 1985.

Plas, A., et al, *Lau System Architecture: A Parallel Data Driven Processor Based on Single Assignment*, Univ. de Toulouse, France, 8/8/76.

Rodriguez, J. E., *A Graph Model for Reproduction*, M.I.T., Laboratory for Computer Science, Sep. 1969.

Rumbaugh, J. E., *A Parallel Asynchronous Computer Architecture for Data Flow Programs*, M.I.T., Cambridge, Mass., May 1975.

Vedder, R. et al, The Hughes Data Flow Multiprocessor, Hughes Aircraft Co., Box 902, El Segundo, CA, 1985.

*Primary Examiner*—Gareth D. Shaw
*Assistant Examiner*—Adolfo L. Ruiz
*Attorney, Agent, or Firm*—Gerald Altman

[57] ABSTRACT

This invention provides a novel computer design that is capable of utilizing large numbers of very large scale integrated (VLSI) circuit chips as a basis for efficient high performance computation. This design is a static dataflow architecture of the type in which a plurality of dataflow processing elements communicate externally by means of input/output circuitry, and internally by means of packets sent through a routing network that implements a transmission path from any processing element to any other processing element. This design effects processing element transactions on data according to a distribution of instructions that is at most partially ordered. These instructions correspond to the nodes of a directed graph in which any pair of nodes connected by an arc corresponds to a predecessor-successor pair of instructions. Generally each predecessor instruction has one or more successor instructions, and each successor instruction has one or more predecessor instructions. In accordance with the present invention, these instructions include associations of execution components and enable components identified by instruction indices.

30 Claims, 17 Drawing Sheets

```
function Quadratic (
    a, b, c:  real)
    returns (complex, complex)
    type complex = record [re, im: real]
    let D : = b * b - 4.0 * a * c;
        Y : = 1 / (2.0 * a);
    in  if D ≥ 0.0
        then
            let X : = SqRt (D)
            in record [re:  (-b + X) * Y; im: 0.0]
               record [re:  (-b - X) * Y; im: 0.0]
            endlet
        else
            let X : = SqRt (-D)
            in record [re: -b * Y; im: X * Y]
               record [re: -b * Y; im: -X * Y]
            endlet
        endif
    endlet
endfun The Quadratic Formula Written In Val
```

*Fig. 3*

Instruction Format (a) The three-specifier instructions

| opcode | modes | br |
|---|---|---|
| a-oper-spec | | |
| b-oper-spec | | |
| result-spec | | |

(b) The two-specifier instructions

| ------------------- | | | |
|---|---|---|---|
| opcode | --- | modes | br |
| oper-spec | | | |
| result-spec | | | |

*Fig. 6*

Normal Mode (N)

Specifier

| ---- | D-address |
|---|---|

*Fig. 7*

Constant Mode (C)

Specifier

| data |
|---|

*Fig. 8*

Indexed Mode in Data Memory (ID)

Specifier

| 0 | ------ | C-Mem address |
|---|---|---|

C-Mem:

| du | w | D-Mem base address |
|---|---|---|

*Fig. 9*

Indexed Mode in Array Memory (IA)

Specifier:

| 1 | ------ | C-Mem address |
|---|---|---|

C-Mem:

| du | w | offset |
|---|---|---|
| A-Mem base address | | |

*Fig. 10*

Control Memory Read/Write (CM)

Specifier:

| mo | -- | C-Mem address |
|---|---|---|

*Fig. 11*

Uncontrolled Queue in Data Memory (UDQ)

Specifier:

| mo | -- | C-Mem address |
|---|---|---|

C-Mem:

| du | w | D-Mem address |
|---|---|---|

*Fig. 12*

Uncontrolled Queue in Array Memory (UAQ)

Specifier:

| mo | -- | C-Mem address |
|---|---|---|

C-Mem:

| du | w | index |
|---|---|---|
| A-Mem base address | | |

*Fig. 13*

Controlled Queue in Array Memory (CAQ)

Specifier:

| mo | -- | C-Mem Address |
|---|---|---|

C-Mem:

| du | w | in-index |
|---|---|---|
|  | w | out-index |
| A-Mem base-address | | |

*Fig 14*

Packet Send/Receive (PSR)

Specifier:

| mo | -- | C-Mem Address |
|---|---|---|

C-Mem (to send, if specifier is result-spec):

| w | count | rcv-blk |
|---|---|---|
| du | | snd-cell |
| | rcv-pe | |

C-Mem (to receive, if specifier is operand-spec):

| w | in-index | snd-blk |
|---|---|---|
| du | out-index | rcv-cell |
| | rcv-pe | |
| --- | D-Mem address | |

*Fig. 15*

Input/Output transfer (IOT)

Specifier:

| mo | du | C-Mem address |
|---|---|---|

C-Mem:

| channel | Acknowledge |
|---|---|

```
0
  ┌──────────┐
  │          │
  │          │        FE = Full/Empty flag
15│          │        RW = Read/Write flag
  └──────────┘
        │
        ▼
┌──┬──┬──┬─────────────────┬──────┐
│FE│RW│du│  data (64 bit)  │ cell │
└──┴──┴──┴─────────────────┴──────┘
```

*Fig. 16*

Normal Signal Word

| sig | end | instr index |
|---|---|---|

*Fig. 17*

Short Signal Word

| pair | instr ref | instr ref |
|---|---|---|

*Fig. 18*

Change Base Word

| change | instr index |
|---|---|

*Fig. 19*

Jump Word

| jump | jump address |
|---|---|

*Fig. 20*

Conditional Jump Word

| test | cond | jump rel |
|---|---|---|

*Fig. 21*

Skip Word

| skip | end | mask | sense |
|---|---|---|---|

*Fig. 22*

Dispatch Word

| disp | control | end |
|---|---|---|

*Fig. 23*

```
function Smooth(
    Q: Grid;      % state values
    S: Grid:      % residuals
    D: Grid:      % Jacobian
    smu: real:    % smoothing parameter
    n: integer    % grid size
    returns Grid) % smoothed data
    type Grid = array[array[array[real]]]:
    let
        sml: real : = .5 * smu;
    in
        forall j in [1, n], k in [1, n], 1 in [1, n]
        construct
            if j = 1   k = 1   l = 1   j = n   k = n   l = n
            then   % boundary point -- no change
                S[j, k, 1]
            elseif j = 2   j = n - 1
            then   % point is next to boundary in j-direction
                   % -- use second order formula
                S[j, k, 1] + smi * (
                    + Q[j + 1, k, 1] * D[j + 1, k, 1]
                    - 2.0 * Q[j, k, 1] * D[j, k, 1]
                    + Q[j - 1, k, 1] * D[j - 1, k, 1]
                ) / D[j, k, 1]
            else   % interior point -- use fourth order formula
                S[j, k, 1] - smu * (
                    + Q[j + 2, k, 1] * D[j + 2, k, 1]
                    - 4.0 * Q[j + 1, k, 1] * D[j + 1, k, 1]
                    + 6.0 * Q[j, k, 1] * D[j, k, 1]
                    - 4.0 * Q[j - 1, k, 1] * D[j - 1, k, 1]
                    + Q[j - 2, k, 1] * D[j - 2, k, 1]
                ) / D[j, k, 1]
            endif
        endall;
    endlet
endfun
```

The Smooth Function Witten in Val for One Physical
Quantity and for One Direction of Processing.

*Fig. 31*

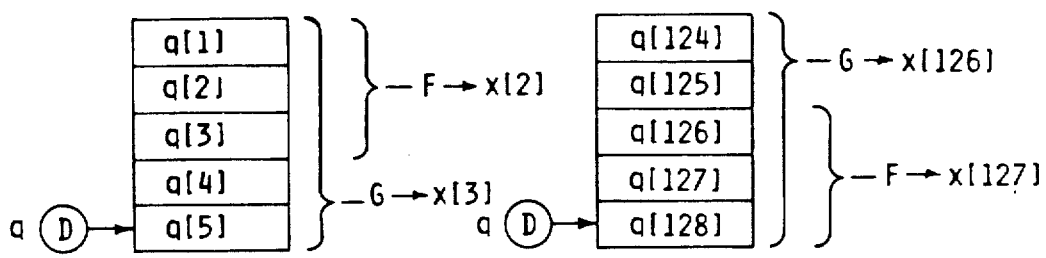
Fig. 34
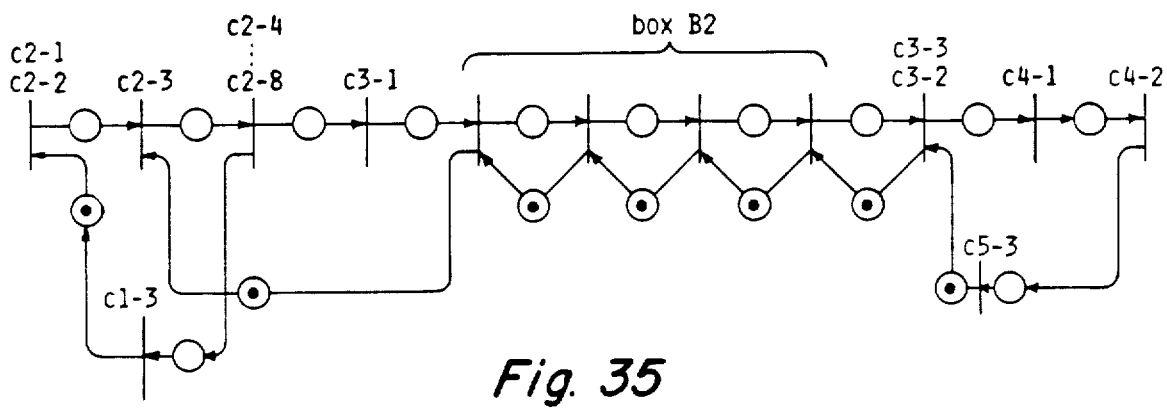
Fig. 35
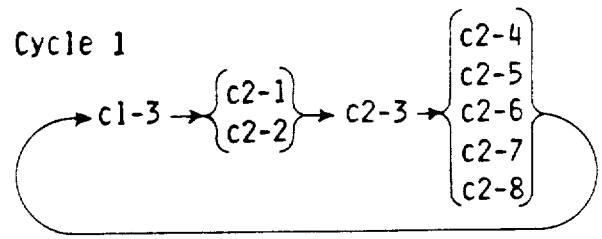
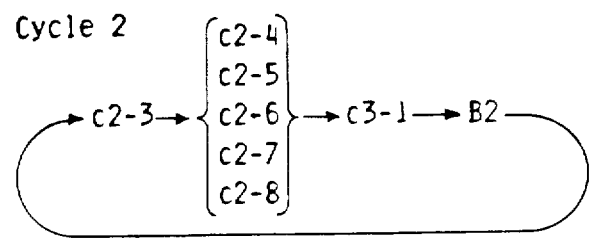
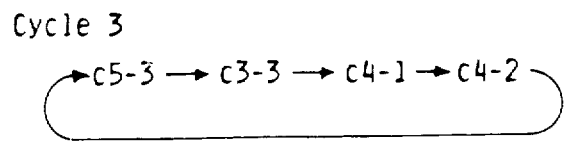
Fig. 36

DATAFLOW PROCESSING ELEMENT, MULTIPROCESSOR, AND PROCESSES

BACKGROUND OF THE INVENTION

1. Field Of The Invention

The present invention relates to parallel computer architecture and processes, and, more particularly, to dataflow processing elements, dataflow computers comprising a plurality thereof, and dataflow processes. Still more particularly, the present invention relates to high performance numerical computing to which dataflow computer architecture and techniques are particularly applicable.

2. The Related Art

It is now generally recognized that efficient application of modern integrated circuit technology to high performance computation requires use of highly parallel computer architectures—machines having many processing sites (processing elements) where stored instructions are activated and executed. The usual form of a highly parallel computer is a collection of a number of sequential processing elements that intercommunicate either by sharing access to a common global memory, or by sending messages to one another by means of some form of interconnection network. Computers with this architecture are limited in the performance they can achieve in numerical computation for several reasons, a principal one being the reduction of performance involved in coordinating operations in the several processing elements. Dataflow computer architecture is a concept for the organization of processing elements in which instructions are activated promptly after the data values on which they operate become available for use. In the dataflow computer of the present invention, many dataflow processing elements are interconnected by a packet routing network that allows any processing element to send packets of information to any other processing element. These processing elements are capable of processing many instructions concurrently and incorporate an efficient mechanism for indicating which instructions are ready for execution. This structure performs the synchronization functions for coordination of concurrent activities, including the conditioning of instruction activation in one processing element on the arrival of a packet from another processing element. This dataflow computer is capable of greater efficiency in highly parallel computation than is possible with other known parallel computer architectures. In contrast with a conventional machine language program, which corresponds to a sequentially executed array of instructions, a dataflow machine program corresponds to a directed graph in which each node represents a dataflow instruction and each arc represents a data dependency of one instruction on the result produced by another instruction. Descriptions of the form and behavior of dataflow programs use the terminology of the theory of directed graphs, and are related to the system modeling theory known as Petri nets. The unconventional form of dataflow programs requires a significant change in the way programs are written and transformed into machine language. In place of languages like Fortran, which are designed for efficient program execution on sequential computers, functional programming languages such as Val are better suited for programming dataflow computers. Functional languages have the property that the flow of data values from definition to use is directly evident from the text and structure of the source language program. In a language such as Fortran, complicated analytical techniques are needed to identify the flow of data. In some Fortran programs, this flow may be impossible to determine.

REFERENCES

The present invention is an advance beyond certain earlier dataflow concepts, which are disclosed and claimed in the following U.S. patents, and in which the present inventor is a joint or sole inventor:

1. U.S. Pat. No. 3,962,706, dated June 8, 1976, for Data Processing Apparatus for Highly Parallel Execution of Stored Programs;
2. U.S. Pat. No. 4,128,882, dated Dec. 5, 1978, for Packet Memory System with Hierarchical Structure;
3. U.S. Pat. No. 4,130,885, dated Dec. 19, 1978, for Packet Memory System for Processing Many Independent Memory Transactions Concurrently;
4. U.S. Pat. No. 4,145,733, dated Mar. 20, 1979, for Data Processing Apparatus for Highly Parallel Execution of Stored Programs;
5. U.S. Pat. No. 4,149,240, dated Apr. 10, 1979, for Data Processing Apparatus for Highly Parallel Execution of Data Structure Operations; and
6. U.S. Pat. No. 4,153,932, dated May 8, 1979, for Data Processing Apparatus for Highly Parallel Execution of Stored Programs.

The following references also are cited as being relevant to the present invention. In these references, CGS and LCS refer respectively to the Computation Structures Group and the Laboratory for Computer Science at the Massachusetts Institute of Technology (MIT), 545 Technology Square, Cambridge, Mass., U.S.A. 02139, where much of the work on dataflow technology has been done.

7. Ackerman, W. B. Data Flow Languages, *Computer, IEEE, February,* 1982. Previously appeared in Proc. of the 1979 Nat. Comp. Conf., August 1979 and as CSG Memo 177, May 1979.
8. Ackerman, W. B. and Dennis, J. B. VAL—*A Value-oriented Algorithmic Language: Preliminary Reference Manual.* Report MIT/LCS/TR-218, LCS, June 1978.
9. Adams, G. B., Brown R. L., and Denning, P. J. Report on an Evaluation Study of Data Flow Computation. Research Institute for Advanced Computer Science, Moffett Field, Calif., April 1985.
10. Agerwala, T. and Arvind, Eds. Special issue on Data Flow Systems. *Computer* 15,2, February 1982.
11. Arvind, and K. P. Gostelow. A Computer Capable of Exchanging Processors for Time. Information Processing 77: Proceedings of IFIP Congress 77, Toronto, Canada, August 1977, pp. 849-853.
12. Arvind and Kathail, V. A Multiple Processor Dataflow Machine That Supports Generalized Procedures. Proc. of the Eight Ann. Arch. Conf., May, 1981. Also published as CSG Memo 205-1, June 1981.
13. Beam, R. and Warming, R. F. An Implicit finite-difference algorithm for hyperbolic systems in conservation-law-form. *J. Comp. Physics,* September 1976.
14. Cornish, M., et al. The TI Data Flow Architectures: The Power of Concurrency for Avionics. Proceedings of the Third Digital Avionics Systems Conference, November 1979, pp. 19-25.
15. Currie, I. G., *Fundamental Mechanics of Fluids.* McGraw-Hill, New York, 1974.

16. Davis, A. L., and Keller, R. M., "Dataflow Program Graphs. *Computer* 15, 2, February 1982, 26–41.
17. Dennis, J. B. First Version of a Data Flow Procedure Language. In Programming Symposium, B. Robinet, Ed., Lecture Notes in Computer Science 19: Springer-Verlag, Berlin, Heidelberg, New York, 1984. Also published as MIT/LCS/TM-61, May 1975.
18. Dennis, J. B. Data Flow Supercomputers. *Computer* 13, 11 November 1980.
19. Dennis, J. B. An Operational Semantics for a Language With Early Completion Data Structures. *Informal Description of Programming Concepts*, Berlin, Heidelberg, New York: Springer-Verlag, 1981. Also published as CSG Memo 207, February 1981.
20. Dennis, J. B., Gao, G. R., and Todd, K. R. *A Data Flow Supercomputer.*" CSG Memo 213, March 1982.
21. Dennis, J. B. and Misunas, D. P. A Preliminary Architecture for a Basic Data Flow Computer. *Proc. of the Second Ann. Symp. on Computer Architecture*, IEEE, 1975. Also published as CSG Memo 102, August 1974.
22. Dennis, J. B., Stoy, J. E., and Guharoy, B. *VIM: An Experimental Muli-User System Supporting Functional Programming*. CSG Memo 238, April 1984.
23. Douglas, J., Jr., and Gunn, J. E., A General Formulation of Alternating Direction Methods. *Numer. Math.* 4 (1964), 428.
24. Fosseen, J. B., *Representation of Algorithms by Maximally Parallel Schemata*. Master Th., Dept. of Electrical Engineering and Computer Science, MIT, June 1972.
25. Gao, G-R. *An Implementation Scheme for Array of Operations in Static Data Flow Computers*. LCS, Master's thesis, Department of Electrical Engineering and Computer Science, MIT, Cambridge, Mass. June 1982.
26. Gao, G-R., *A Maximally Pipelined Tridiagonal Linear Equation Solver.* CGS Memo 254, August 1985.
27. Gurd, J. R., C. C. Kirkham, and I. Watson, The Manchester Dataflow Prototype Computer. *Communications of the ACM* 28, January 1985, 34–52.
28. Kahn, G., The Semantics of a Simple Language for Parallel Programming. Information Processing 74: Proceedings of the IFIP Congress 74, 1974, pp. 471–475.
29. Karp, R. M., and Miller, R. E., Properties of a model for parallel computations: determinacy, termination and queueing. SIAM *J. Appl. Math.* 14, November 1966.
30. Kogge, P. M., *The Architecture of Pipelined Computers*, McGraw-Hill, New York, NY 1981.
31. McGraw, J., *Data Flow Computing—The Val Language.* Computation Structures Group Memo 188, January 1980.
32. Montz, L. *Safety and Optimization Transformations for Data Flow Programs*. MIT/LCS/TR-240, LCS. Master's thesis, Department of Electrical Engineering and Computer Science, MIT, Cambridge, MA, June 1980.
33. NEC Electronics, Inc., *Advanced Product Information User's Manual: PD7281 Image Pipelined Processor.* Mountain View, CA, 1985
34. Patil, S. S. Closure Properties of Interconnections of Determinate Systems. Record of the Project MAC Conference on Concurrent Systems and Parallel Computation, ACM, New York, NY, 1970.
35. Peterson, J. L., *Petri Net Theory and the Modeling of Systems*. Prentice-Hall, Englewood Cliffs, NJ, 1981.
36. Pulliam, T. H. and Steger, J. L. On Implicit Finite-Difference Simulations of Three Dimensional Flow. American Institute of Aeronautics and Astronautics, January 1978.
37. Ramchandani, C., On The Computation Rate of Asynchronous Computation Systems, Proc. of the Seventh Ann. Princeton Conf. on Information Sciences and Systems, 1973.
38. Rodriguez, J. E., *A Graph Model For Parallel Computation*. Ph.D. Th., MIT, September 1969.
39. Van Horn, E., *Computer Design for Asynchronously Reproducible Multiprocessing*, MAC/TR-34, Project MAC, MIT November 1966.
40. Vedder, R., Campbell, M., and Tucker, G., The Hughes Data Flow Multiprocessor. Proceedings of the 5th International Conference on Distributed Computing systems, Denver CO, 1985, pp. 2–9.
41. Watson I. and J. Gurd, A Practical Data Flow Computer. *Computer* 15, 2, February 1982, 51–57.
42. Wetherell, C. S., Error Data Values in the Data-Flow Language VAL. Transactions on Programming Languages and Systems 4, 2, April 1982, 226–238.
43. Yuba, T., T. Shimada, K. Hiraki, and H. Kashiwagi. Sigma-1: A Dataflow Computer For Scientific Computation. Electronical Laboratory, 1-1-4 Umesono, Sakuramura, Niiharigun, Ibaraki 305, Japan, 1984.
44. Plas, A., Lau System Architecture: A Parallel Data-Driven Processor Based on Single Assignment. University de Toulouse, France, August, 1976.
45. Rumbaugh, J. E., *A Parallel Asynchronous Computer Architecture for Data Flow Programs*. MIT Thesis, Project MAC, May 1975.
46 U.S. Pat. No. 3,978,452, issued August 1976, in the names of Barton, R. S., et al, for "System and Method for Concurrent and Pipeline Processing Employing a Data Driven Network."
47. U.S. Pat. No. 4,197,589, issued April 1980, in the name of Cornish, M. A., et al, for Operation Sequencing Mechanism.
48. U.S. Pat. No. 4,413,318, issued November 1983, in the name of Herrington, K. M., for Use of Nodes to Uniquely Identify Processes.
49. U.S. Pat. No. 4,591,979, issued May 1986, in the name of Iwashita, M. for Data-Flow-Type Digital Processing Apparatus.
50. U.S. Pat. No. 4,644,461, issued February 1987, in the name of Jennings, G. A., for Dynamic Activity-Creating Data Driven Computer Architecture.
51. U.S. Pat. No. 4,675,806, issued June 1987, in the name of Uchida, K. for Data Processing Unit Utilizing Data Flow Ordered Execution.
52. Jenkins, R. A. *Supercomputers of Today and Tomorrow*, Tab Books, Inc., Blue Ridge Summit, PA 17213, pp. 92–94.
53. Reisign, W., *Petri Nets*, Springer Verlog, Berlin, Heidelberg, New York, 1982, Chapters 1 and 3.
54. Hwant, K., and Briggs, F. A., *Computer Architecture and Parallel Processing*, McGraw Hill, Inc., New York, 1984, Sections 10.1 and 10.2.

SUMMARY OF THE INVENTION

The general object of the present invention is to provide a novel computer design that is capable of utilizing large numbers of very large scale integrated (VLSI) circuit chips as a basis for efficient high performance computation. This design is a dataflow architecture of the type in which a plurality of dataflow processing elements communicate externally by means of input-/output circuitry, and internally by means of packets sent through a routing network that implements a transmission path from any processing element to any other processing element. This design effects processing element transactions on data according to a distribution of instructions that is at most partially ordered. These instructions correspond to the nodes of a directed graph in which any pair of nodes connected by an arc corresponds to a predecessor-successor pair of instructions. Generally each predecessor instruction has one or more successor instructions, and each successor instruction has one or more predecessor instructions. In accordance with the present invention, these instructions include associations of execution components and enable components identified by instruction indices.

A more specific object of the present invention is to provide data processing means for effecting data processing transactions according to programs of instructions, which data processing means comprises: execution means for effecting execution transactions and enable means for effecting enable transactions, completions of execution transactions causing transmission of fire signals from the execution means to the enable means, completions of enable transactions causing transmission of fire signals from the enable means to the execution means; the instructions including execution specifiers having enable indices, given associations of execution indices and enable indices constituting given instruction indices; the enable means being repsonsive to sets of the done signals for performing enable transactions according to the enable specifiers, the execution means being responsive to sets of the fire signals to perform execution transactions according to the execution specifiers on sets of operators and operands; the occurrence of a particular fire signal being conditioned on the reception by the enable means of at least one of the done signals, each of which corresponds to an enable specifier that refers to the instruction index associated with the particular fire signal.

A still more specific object of the present invention is to provide data processing means for effecting processing transactions according to programs of instructions including directed predecessor-successor pairs of instructions, a predecessor instruction having one or more successor instructions, a successor instruction having one or more predecessor instructions, the data processing means comprising first means for transacting instruction execution components specifying operands and operators to produce execution results pertinent to further operands and further operators, and execution completion signals pertinent to these execution results; second means for transacting instruction enable components specifying sequencing to produce enable events pertinent to further sequencing, and enable completion signals pertinent to these enable events; associations of the execution components and the enable components, and associations of the execution completion signals and the enable completion signals having associated indices corresponding to the instruction indices; and third means for transmitting the enable completion signals from the second means to the first means, and for transmitting the execution completion signals from the first means to the second means; transaction of a given execution component and transaction of a given enable component, which have associated indices corresponding to one of the instruction indices, occurring respectively in the first means and the second means; transaction of a given successor instruction being contingent on transmission of execution completion signals and enable completion signals of the predecessor instructions of the given successor instruction from the first means to the second means and from second means to the first means, by the third means. The structure of the processing element is particularly adapted for use with a routing network that is software switched, rather than hardware switched. The arrangement is such that transactions, including transactions between different processing elements, occur at times that are arbitrary with respect to a given order of the instructions, thereby achieving a high percentage of peak performance.

Other objects will in part be obvious and will in part appear hereinafter.

BRIEF DESCRIPTION OF THE DRAWINGS

For a fuller understanding of the nature and objects of the present invention, reference is made to the following description, which is to be taken in connection with the accompanying drawings wherein:

FIG. 3 illustrates certain programming principles of Val, a functional language that is supported by the dataflow computer of FIG. 2;

FIG. 6 illustrates the instruction execution component format of a processing element of the present invention.

FIGS. 7 to 16 illustrate details of an instruction set for the execution system of FIG. 1, in the context of the computer of FIG. 2;

FIGS. 17 to 23 illustrate control word formats relating to operation of the enable system of FIG. 1, in the context of the computer of FIG. 2;

FIG. 31 illustrates a data smoothing function written in the Val programming language for one physical quantity and one direction of processing;

FIG. 34 illustrates further principles of result queueing in the present invention;

FIG. 35 illustrates Petri net principles as applied to program analysis for the present invention; and FIG. 36 illustrates cycles corresponding to certain dependency relationships in FIGS. 32 and 33.

DESCRIPTION OF THE PREFERRED EMBODIMENT

Figure 1:
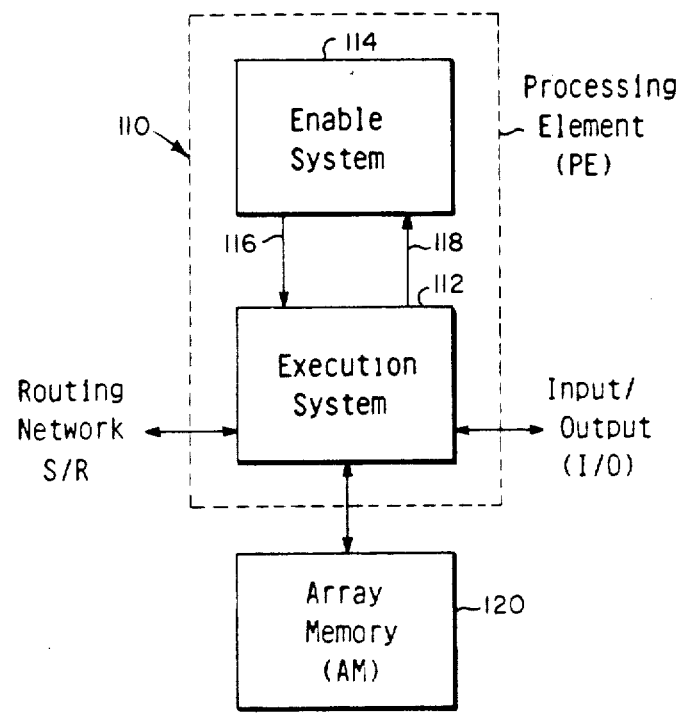
FIG. 1 illustrates a dataflow processing element embodying the present invention.
Figure 2:
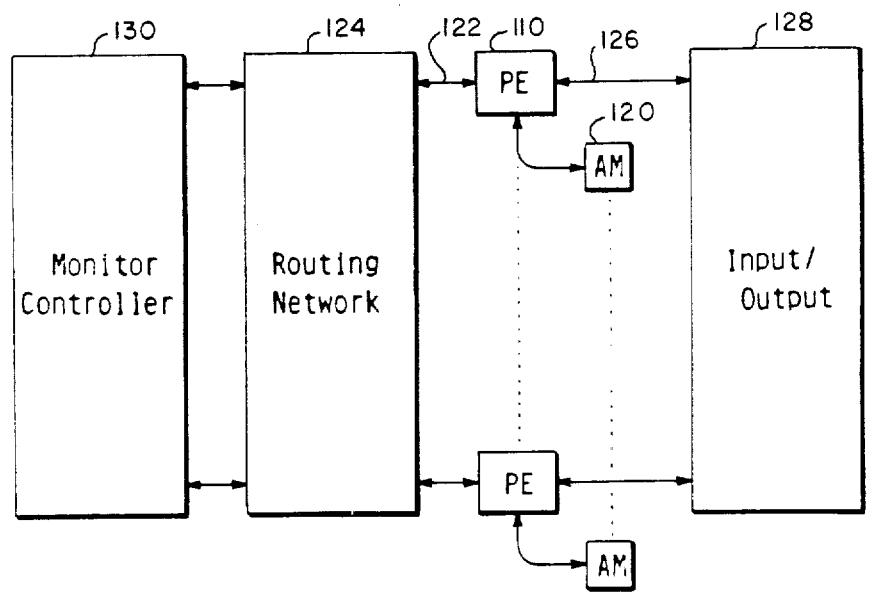
FIG. 2 illustrates a dataflow computer comprising a plurality of dataflow processing elements of the type shown in FIG. 1.
Figure 4:
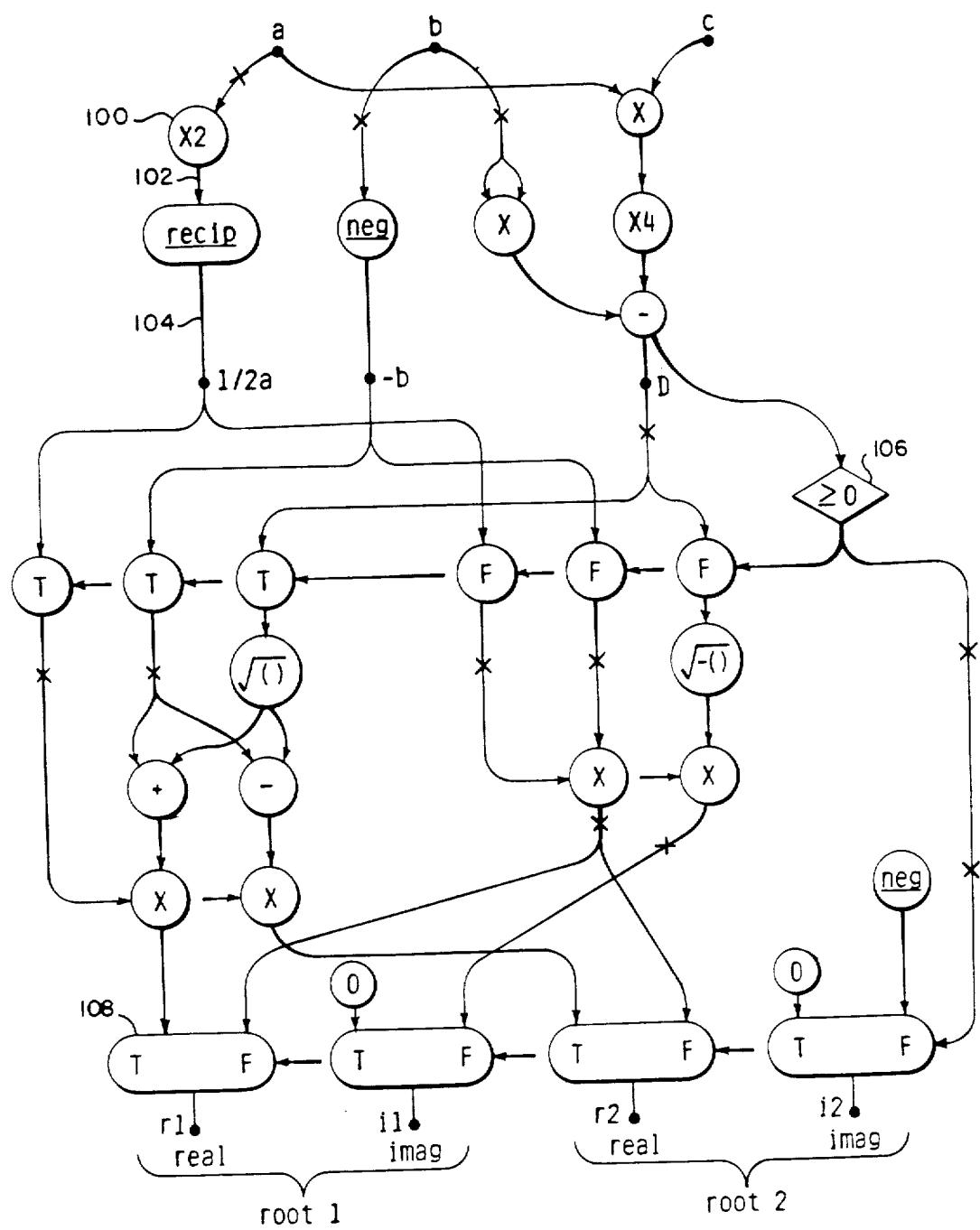
FIG. 4 illustrates dataflow graph principles that correspond to the programming principles of FIG. 3.

(I) The Model of Computation for the Architecture of FIGS. 1 and 2 as Exemplified in FIGS. 3 and 4

Dataflow architecture makes possible a major change in the way programs are expressed. The preferred language for use with the present architecture is Val, a language developed at the Massachusetts Institute of Technology, substantially as described in Ref. 2. Val is a functional programming language that is designed to allow easy determination of program parts that may be executed simultaneously. Although various features of the present architecture will be explained in connection with Val, it is to be understood that the present architecture is capable of supporting other languages, for example, Fortran, particularly if constrained by appropriate rules for ensuring identification and implementation of parallelism. In the program examples shown below, data type declarations have been omitted in order to maintain simplicity.

In thinking about computer systems and how they may be programmed, it is important to have a model of computation as a guide. For conventional computers, the model of the store (or address space) and the program counter selecting successive instructions for execution is fundamental. For dataflow computers of the type illustrated in FIGS. 1 and 2, a new model of computation is required. To illustrate this model, consider the well known quadratic formula for the roots of a second order algebraic equation with real coefficients $$az^2 + bz + c = 0$$

The complex roots of the quadratic are given by $$z = \frac{-b \pm \sqrt{b^2 - 4ac}}{2a}$$

A program expressed in Val to compute the two complex root values is shown in FIG. 3. Note that the complex values are represented by a user defined record type having fields for the real and imaginary components. A dataflow graph for this computation is given in FIG. 4. This graph consists of nodes (or actors) 100 connected by arcs (or links) 102, with tokens (or packets) 104 being carried by the arcs and being consumed by the nodes to indicate the flow of information from predecessor nodes to successor nodes. Although the terms "tokens" and "packets" are sometimes used interchangeably, "tokens" is used in discussing the abstract dataflow model, and "packets" is used in discussing implementations of the model. The nodes respond to the presence of tokens on their input arcs by "firing"—applying nodes to ready (entry) tokens on input arcs to produce result (derived) tokens on output arcs. Because a node can fire whenever it has ready tokens on its input arcs and token-free output arcs, dataflow graphs can be configured in stages in the same manner as conventional pipelined functional units. In the static dataflow design of the present embodiment, an arc may carry no more than one token. The significance of the dataflow model regarding the present invention is that the nodes correspond to instructions, the arcs to functional dependencies between the instructions in pairs, and the tokens to information generated by predecessor instructions for processing by successor instructions.

As shown in FIG. 4, self-explanatory nodes that represent constants and arithmetic operators are shown as circles with such labels as $\times 2$, recip, neg, $\times$, $\times 4$, $-$, T, F, $\sqrt{0}$, $+$, and 0. The diamond shaped node 106 with the label $\geq 0$ is a decider that performs a test on its data input and sends the resulting boolean truth value to its successors. The circular nodes inscribed with T or F are gates that pass a data value if and only if the boolean control input matches the label. At the bottom of the graph are four merge nodes, shown as capsules 108 labelled (F T), which pass one value from the specified data input for each boolean token received. Except for the merge node, all nodes behave according to the same simple firing rule: a node is enabled if and only if a token is present on each of its input arcs and there is no token on any of its output arcs. The merge node is special; it is enabled only when a boolean token is present and a data token is present at the input corresponding to the truth value carried by the boolean token (the output arc must be empty). Although examples of program graphs and their Val language equivalents are given herein for completeness, it is not necessary to follow these examples in detail in order to understand the design that is the primary subject of this disclosure.

It can be shown that graphs of the illustrated type exhibit the behavior necessary for generating one set of output data derived for each set of input data entered. Furthermore, the final configuration of tokens in the graph and the values they represent is independent of the order in which enabled nodes are fired. This property, which is called determinacy, makes it possible for a functional programming language such as Val to express parallelism without suffering from the timing hazards and races that make the development and debugging of conventional multiprocessor programs very challenging.

The dataflow graph computational model is a useful representation of the meaning of parallel programs and their hardware implementations. The essence of the present invention is in an improved representation that results in an especially efficient design for corresponding hardware implementations. These are discussed in the following sections.

(II) The Illustrated Architecture—FIGS. 1 and 2

As indicated above, the present architecture contemplates a dataflow processing element for effecting processing element transactions on data according to programs of particularly related instructions. These instructions are such that directed predecessor-successor pairs of instructions are related by functional dependencies, a predecessor instruction having one or more successor instructions, and a successor instruction having one or more predecessor instructions.

As shown at 110, the illustrated processing element comprises an execution system 112 and an enable system 114 having components that will be described in detail in connection with FIG. 5. Generally, the components of the execution system include execution memory, arithmetic/logic, and execution control circuitry; and the components of the enable system include enable memory and enable control circuitry, of which the enable memory includes accumulation memory and distribution memory circuitry. Execution system 112 and enable system 114 are operatively connected for communication therebetween of fire commands 116 and done commands 118. The instructions include execution components which are processed by execution system 112 and enable components which are processed by enable system 114, each instruction being identified by a unique instruction index. Fire commands 116 and done commands 118 include instruction index specifiers.

Generally, the fields of the instruction execution components include opcodes and, optionally, data constants and/or input data address specifiers and output data address specifiers. In other words, an instruction execution component typically includes an opcode, optionally a data constant, one or more input data address specifiers, and one or more output data address specifiers. The input data include operand values and the output data include result values and/or result conditions. Execution system 112 stores instruction execution components at memory locations corresponding to instruction index specifiers and data at memory locations corresponding to certain data address specifiers. An instruction execution transaction involving the arithmetic/logic circuitry includes retrieval of an instruction execution component and corresponding input data from memory locations in execution system 112, processing of an instruction execution component by the arithmetic/logic circuitry to produce output data, and storage of output data in memory locations of the execution system 112. The execution system is responsive to a fire command 116 to cause an instruction execution transaction, and, after its completion, with or without indication of a result condition, to cause generation of a done command 118.

Generally, the fields of the instruction enable components include control fields for indicating the enabled status of instructions, and lists of the indices of enable components of predecessor and successor instructions together with code governing interpretation of instruction completion codes that accompany the done commands for certain instructions. The control fields of a given instruction typically include a count field and a reset field. The reset field is fixed during program execution. The count field changes during program execution to reflect completion of selected successor and predecessor instructions. Enable system 114 stores instruction enable components at memory locations corresponding to instruction indices. An instruction enable transaction includes accumulating a count for a given count field until an enable count is indicated, transmitting a fire command to execution system 112, receiving a done command from execution system 112, and distributing signals representing the done command to the indicators of the successor and predecessor instructions.

The multiprocessor of FIG. 2 embodies a plurality of processing elements 110 and a plurality of array memories 120, one processing element directly addressing only one array memory. The processing elements communicate internally via paths 122 through a routing network 124 and externally via paths 126 through an input/output network 128. The multiprocessor is controlled by a monitor controller 130.

A processing element transaction includes generation of a fire command following occurrence of an enable condition, an arithmetic/logic transaction to generate a done command, and recordation of this transaction in the indicator memory. The arrangement is such that processing element transactions, in any processing element and between processing elements, occur at times that are arbitrary with respect to a given order of the instructions, thereby achieving a high percentage of peak performance.

Figure 5:
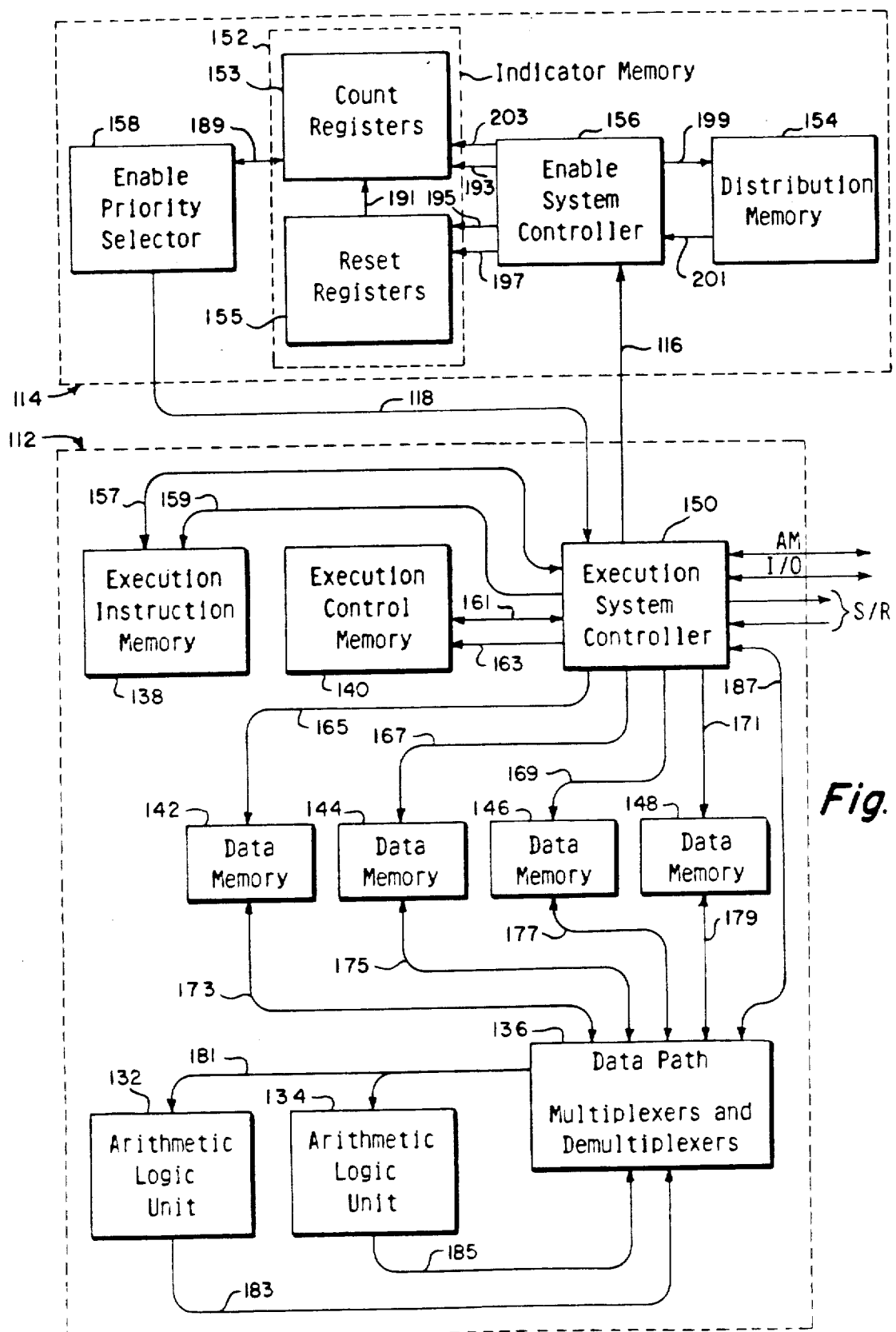
FIG. 5 illustrates details of an execution system and an enable system that are components of the processing element of FIG. 1.

(III) The Execution System—FIG. 5

As shown in FIG. 5, execution system 112 includes functional units 132, 134 as a functional system and switching circuitry 136. The functional system performs arithmetic and/or logic operations on operand values to produce result values. In addition to result values, the functional units produce completion codes which indicate the outcomes of various tests on the result values, e.g., zero/non-zero, negative/positive. Functional unit 132 performs floating point multiplication. Functional unit 134 performs floating point addition and fixed point arithmetic. Functional units 132, 134 are pipelined, each consisting of several logic stages separated by memory latches, and arranged so that, whenever an instruction is enabled, the arguments of its operation, say A and B, are fed into the first stage of the functional unit and at some later time the result R is presented by the final stage. The control is arranged in such a way that several sets of arguments may be entered into the functional unit before an earlier result is delivered. Such functional units are sold by Weitek under the trade designations WTL 1064 and WTL 1065 and by Analog Devices under the trade designations ADSP-3210 and ADSP-3220. Routing circuitry 136 is a gate array for multiplexing and demultiplexing.

Execution system 112 includes also an execution instruction memory 138, an execution control memory 140, four data memories (DM) 142, 144, 146, 148, and an execution system controller 150. Each of the instruction execution components, all of which are stored in execution instruction memory 138, includes at least one opcode, references to one or two operand values (constants and/or operand address specifiers), and a result address specifier corresponding to the destined location of the result value. Data memories 142, 144, 146, 148 store operand values and result values so referenced according to execution instructions being currently applied to functional system 132, 134. The architecture provides indexed addressing for the data memories and array memories and incrementing to establish modes of operand fetch and result store suitable for generating FIFO queues in the data memories and array memory. The storage locations of these operand values and result values correspond, respectively, in a dataflow graph, to tokens on the input arcs and the output arcs of a firing node. Execution control memory 140 stores control words for indirect addressing and control blocks for first-in-first-out (FIFO) queues allocated in the data memories and the array memory.

Execution system controller 150 mediates execution transactions as directed by its interaction with the enable system. A signal via fire path 116 is triggered when an enable condition has occurred, and a done signal via done path 118 is triggered when the execution system has completed an execution transaction. Following receipt of fire signal 116 by execution controller 150, the opcode and operand values corresponding to the operand specifiers are accessed and a result value corresponding to the result specifier is assigned by functional system 132, 134. An operand specifier or a result specifier may variously refer to a location within the data memory, the array memories or the control memory.

As shown: execution instruction memory 138 is a static random access memory (SRAM) of 4K by 64 bits, that is read-only except during program loading; control memory 140 is a 4K by 16 bit SRAM; each data memory 142, 144, 146, 148 is a 16K by 32 bit SRAM; each array memory 120 is a dynamic random access memory with 1 megaword of storage and is capable of holding large blocks of data such as numerical matrices. As shown: execution system controller 150 and execution instruction memory 138 communicate via address path 159 and data path 157; execution system controller 150 and execution control memory 140 communicate via a data path 161 and an address path 163; execution system controller 150 and data memories 142, 144, 146, 148 communicate via address paths 165, 167, 169, 171; data memories 142, 144, 146, 148 and multiplex/demultiplex circuit 136 communicate via data paths 173, 175, 177, 179; multiplex/demultiplex circuit 136 and arithmetic/logic units 132, 134 communicate via data paths 181, 183, 185; and multiplex/demultiplex circuit and execution system controller 150 communicate via data path 187.

(IV) The Enable System—FIG. 5

As shown in FIG. 5, enable system 114 comprises an indicator memory 152, a distribution memory 154, an enable system controller 156, and a priority selector 158. Indicator memory 152 includes indicator registers 153, 155 which respectively, for a given instruction, provide a current enable count that records completions of executions of related predecessor and successor instructions optionally depending on related result conditions, and a reset enable count that restores the registers to reset condition when the given instruction has been selected for execution. The current enable count is a dynamically varying quantity that represents the total number of signals execution system 112 must receive in reference to a given instruction between a given time and the time it becomes enabled. By definition, an instruction is enabled when its current enable count becomes 0. When an instruction cell is fired, its current enable count is reset to a reset enable count. The reset enable count is the total number of signals an instruction cell must receive since its last firing before becoming enabled again. In relation to the corresponding dataflow graph, the reset enable count is the number of nodes that must fire for each instance of firing of the node corresponding to the given instruction. Distribution memory 154 stores lists of instruction indices and, optionally, conditional instructions, the list of instruction indices of a given instruction corresponding to the set of given successor and predecessor dependencies. In its various forms, the list of an enable instructions takes such forms as a simple list of instruction identifiers, or conditional list (e.g., "if the result is zero, signal instruction cell Z, otherwise signal cell J"). Priority selector 158 arranges the transmission of fire signals through fire path 116 from enable system 114 to execution system 112. Enable indicator 152, enable instruction memory 154, and priority selector 158 are under the control of enable system controller 156, which receives done signals through done path 118 as instruction execution transactions are completed. A done signal corresponds to an invisible return arc between a predecessor node and a successor node, by which the relevant output arc of the predecessor node is known to be token free, a condition that is required before that given node can fire again. Since, as will be explained below, a predecessor node cannot detect when a token it has output has been consumed by its successor node, the successor node must explicitly signal the predecessor node when it has consumed the token. The done signal corresponds to what may be thought of as an implicit acknowledgement arc directed from a successor node to a predecessor node. In the form shown: enable instruction memory 154 is a static random access memory; enable controller 156 is a custom gate array; and priority selector 158 is a "fairness" circuit that ensures execution of any enabled instruction within a predetermined elapsed time following its enablement, i.e. a predetermined number of timing cycles following the time its enable count becomes 0. Priority selector 158 and the registers of indicator memory 152, including 6-bits for each of 4096 instructions, are realized as a full custom or semi-custom integrated circuit—on one chip in a first embodiment, and on several chips in a second embodiment. As shown: enable priority selector 158 and count registers 153 communicate via data path 189; count registers 153 and enable system controller 156 communicate via data path 193 and address path 203; count registers 153 and reset registers 155 communicate via address path 191; count registers and reset registers 153,155 and enable system controller 156 communicate via address path 197 and data path 195; and enable system controller 156 and distribution memory 154 communicate through address path 199, and data path 201.

(V) The Supercomputer of FIGS. 2 and 8

Figure 25:
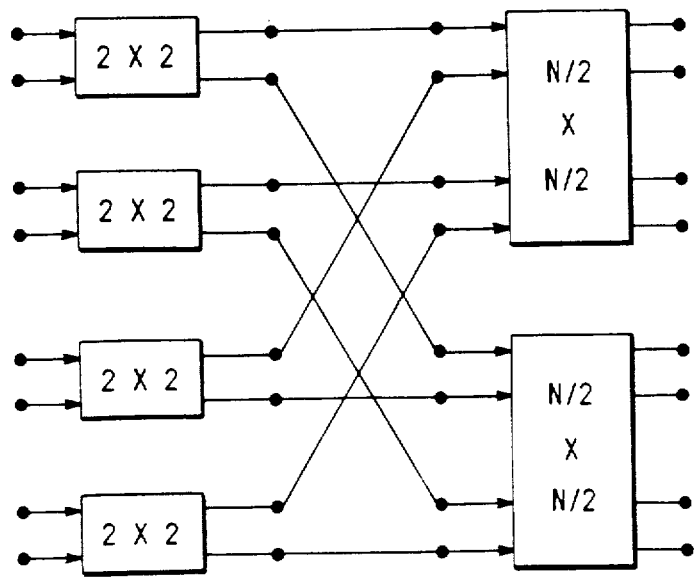
FIG. 25 illustrates 2×2 routers connected to form a packet routing network for the illustrated embodiment of the computer of FIG. 2.

A powerful dataflow supercomputer is constructed by connecting many dataflow processing elements as illustrated in FIG. 2. In the preferred embodiment, the interconnection network is a packet routing network that delivers information packets sent by any source processing element to any specified destination processing element. The packet routing network shown in FIG. 25, which has N input and N output ports, may be assembled from $(N/2)\log_2(N)$ units, each of which is a $2\times 2$ router. A $2\times 2$ router receives packets at two input ports and transmits each received packet at one of its output ports according to an address bit contained in the token. Packets are handled first-come-first-serve, and both output ports may be active concurrently. Delay through an $N\times N$ network increases as $\log_2 N$, and capacity rises nearly linearly with N.

A dataflow program to be executed on this computer is divided into parts that are allocated to the several processing elements. Monitor processors support the translation of programs from a high level language such as Val, and the construction of dataflow machine language programs. The monitor processors also direct the loading of machine language programs into the dataflow processing elements and monitor and control their execution. The manner in which the parts of programs located in the several processing elements communicate through the routing network will be described below in connection with FIG. 26.

In one form, this supercomputer, which includes 256 dataflow processing elements of the aforementioned type, is designed to perform of the order of 1 billion floating point operations per second. To meet the requirements of scientific computation, arithmetic units 52, 54 support high-precision (64-bit) numbers. To achieve this level of performance, it is necessary, as in the present embodiment, that the floating point functional units be closely coupled to data memories 142, 144, 146, 148, which hold numerical values between program executions.

(VI) Further Details and General Operation

As has been indicated and as will be described in greater detail below, the instruction format for the processing element of the present invention has two components, one of which is used by execution system 112 to direct instruction execution, and the other of which is used by enable system 114 to control the enabling of other instructions. The former component uses three-address and two-address instruction formats and specifies an operation which takes operand values from and stores a result value in the data memory. The enable component includes a signal list, an enable count and a reset count. The signal list is a specification of which instructions are to be sent signals upon completion of instruction execution.

The enable system operates as follows. Whenever a signal is sent to instruction i, its enable count is decremented by one. When the enable count becomes zero, instruction i is marked as "enabled". Using a "fair" selection rule, the enable system sends fire commands to the execution system for instructions marked "enabled." Thus, an instruction will consist of a opcode, one or two source specifiers, a result specifier, and a signal list. The two components of the instruction may be thought of as: the portion that specifies the operation and data to be operated upon; and the portion that concerns the sequencing of instruction execution. The following material presents one of the possible designs for the instruction set of a dataflow computer that embodies the disclosed invention. Section VII below describes the execution component of the instruction. Section VIII below describes the enable component of the instruction.

(VII) Instruction Set and Operation—Execution Component

The general formats for the execution components of dataflow instructions are shown in FIG. 6. The execution format has two forms: a form with opcode, two operand specifiers and a result specifier, and a form with opcode, one operand specifier and a result specifier. The second form is distinguished by a special code in the unused first field.

(a) Instruction Format The nomenclature is as follows:

| opcode: | operation code |
| modes: | addressing modes (2 bits per specifier) |
| br: | break (for program testing) |
| oper-spec: | operand source specification |
| a-oper-spec: | a-operand source specification |
| b-oper-spec: | b-operand source specification |
| result-spec: | result specification |

(b) Data Types

The data types supported by the hardware use four sizes of binary word with letter designations as follows:
(1) L-long(64 bits)
(2) S-short(32 bits)
(3) H-half(16 bits)
(4) B-byte(8 bits)

These data are interpreted as the following different data types:
(1) Long floating point numbers (LR): represented in accordance with the IEEE floating point standard with adjustments to accommodate the Val error values pos-over, pos-under, neg-under, neg-over, unknown, undef, and zero-divide.
(b 2) Short floating point numbers (SR): represented in accordance with the IEEE floating point standard with adjustments to accommodate the Val error values pos-over, pos-under, neg-under, neg-over, unknown, undef, and zero-divide.
(3) Fixed point binary numbers (SF): consisting of an error flag, a sign bit and a 30 bit magnitude field (in two's complement form). If the error flag bit is one, the remaining bits contain an encoding of the Val error values pos-over, neg-over, unknown, undef, and zero-divide.
(4) Bit strings (LB,SB,HB,BB): uninterpreted bit strings of length 64, 32, 16 or 8.
(5) Binary numbers (HI,BI): Binary integers in two's complement form (16- and 8- bits) with no error codes.
(6) Characters (BC): Symbols in the ASCII character set represented as 8-bit bytes.

(c) Identity Operations

| LId: | Long Identity | LB—LB |
| SId: | Short Identity | SB—SB |

(d) Operations for Real Arithmetic

| LMul: | Long Real Multiply | LR × LR → LR |
| LAdd: | Long Real Add | LR × LR → LR |
| LSub: | Long Real Subtract | LR × LR → LR |
| LCmp: | Long Real Compare | LR × LR → ( ) |
| SMul: | Short Real Multiply | SR × SR → SR |
| SAdd: | Short Real Add | SR × SR → SR |
| SSub: | Short Real Subtract | SR × SR → SR |
| SCmp: | Short Real Compare | SR × SR — ( ) |

[Support for Real Divide and Square Root]

(e) Operations for Fixed Point Arithmetic

| FAdd: | Fixed Add | SF × SF → SF |
| FSUB: | Fixed Subtract | SF × SF → SF |
| FMult: | Fixed Multiply | SF × SF → SF × SF |
| FMultHigh: | Fixed Fraction Mult. | SF × SF → SF |
| FMultLow: | Fixed Integer Mult. | SF × SF → SF |
| FCmp: | Fixed Compare | SF × SF → ( ) |

[Support for Fixed Divide and Modulo]

(f) Arithmetic Shifts

| FSHL: | Fixed Shift Left | SF × SF → SF |
| FSHR: | Fixed Shift Right | SF × SF → SF |
| FSHR: | Long Shift Left | LF × SF → LF |
| FSHR: | Long Shift Right | LF × SF → LF |

(g) Type Conversion Operations

| LFix: | Long Real to Fixed | LR → SF |
| LMan: | Long Real Extract Mantissa | LR → SF |
| LExp: | Long Real Extract Exponent | LF → SF |

| | -continued | |
|---|---|---|
| SFix: | Short Real to Fixed | SR → SF |
| SMan: | Short Real Extract Mantissa | SR → SF |
| SExp: | Short Real Extract Exponent | SR → SF |
| LFloat: | Fixed to Long Real | SF → LR |
| SFloat: | Fixed to Short Real | SF → SR |

Note: Other conversions, with truncation and extension of operand and result values, are performed during instruction execution, specifically during operand accessing and result storing.

(h) Logical Operations

| And | Short Logic And | SB × SB → SB |
|---|---|---|
| Or | Short Logic Or | SB × SB → SB |
| Xor | Short Logic Exclusive Or | SB × SB → SB |
| LLCycle | Long Left Cycle | LB × SF → LB |
| LRCycle | Long Right Cycle | LB × SF → LB |
| SLCycle | Short Left Cycle | SB × SF → SB |
| SRCycle | Short Right Cycle | SB × SF → SB |
| Set | Set Bit | SB × SF → SB |
| Test | Test Bit | SB × SF → ( ) |

(i) Addressing Modes

The mode field of an instruction specifies the addressing rule for each operand and the result. The basic modes are Normal (N), Constant (C), Indexed (I), and Reference (R), of which Indexed has two options and Reference has six options. These modes may be combined subject to the following restrictions:

(a) In Indexed mode the second specifier gives the index value. Thus, Indexed mode does not apply to dyadic (two-operand) operators.
(b) Indexed mode may be specified only for the first operand specifier and/or the result specifier.
(c) The Reference mode options may be applied to the result specifier and/or just one operand specifier.
(d) Constant data mode applies only to operand specifiers. The nomenclature is as follows:

| mo | Mode Option |
|---|---|
| w | Increment width |
| du | Data unit size |

In Indexed and Reference modes, the data unit field specifies the size of the data unit fetched or stored. Type conversions to and from the types required by the operation code are done (by truncation, padding with zeros or ones, sign extension).

| data unit field (du) | data unit site |
|---|---|
| 00 | 8 bits |
| 01 | 16 bits |
| 10 | 32 bits |
| 11 | 64 bits |

(1) Normal Mode (N)

As shown in FIG. 7, the specifier is a D-Mem address for fetching an operand or storing a result.

(2) Constant Mode (C)

As shown in FIG. 8, in the Constant Mode, the specifier is interpreted as an abbreviation for one of a set of values to be used as an operand. It is converted to the number type required by the operation code.

(3) Indexed Mode in Data Memory (ID)

As shown in FIG. 9, the specifier gives the location of a control word in C-Mem. The operand is fetched from D-mem at the address computed by adding the index value (taken modulo $2^w$) to the D-Mem base address (which is padded as necessary). The index comes from the second specifier of the instruction, which cannot use Indexed Mode.

(4) Indexed Mode in Array Memory (IA)

As shown in FIG. 10, the Indexed Mode in the array memory is analogous to the Indexed Mode in the data memory. The base address is the offset added to the (padded) A-Mem base address. Note that the w field here is twice as large as the w field in ID mode.

(5) Reference Mode (R)

In the Reference Mode, the specifier gives the location of a control block in C-Mem. There are six cases distinguished by the mode option field in the specifier format: CM, UDQ, UAQ, CAQ, PSR, IOT. These are described as follows.

(6) Control Memory Read/Write(CM)

As shown in FIG. 11, the specifier contains the address of a location in the control memory, which serves as the source for an operand or the destination for a result.

(7) Uncontrolled Queue in Data Memory (UDQ)

As shown in FIG. 12, this is used for implementing small FIFO queues where programming conventions are used to prevent FIFO over/underflow. The data memory address is used as the operand address. Then the lowest w bits are incremented modulo $2^w$ and the new address is written back into the control memory.

(8) Uncontrolled Queue in Array Memory (UAQ)

As shown in FIG. 13, this mode is analogous to the UDQ mode, except that here the operand address is the array memory base address plus the index, and the index is the part that is incremented.

(9) Controlled Queue in Array Memory (CAQ)

As shown in FIG. 14, pointers are kept to both ends of the queue. The in-index or the out-index is added to the A-Mem base address and incremented (modulo $2^w$) depending on whether this specifier is an operand-spec or a result-spec.

(10) Packet Send/Receive(PSR)

FIG. 15 illustrates the specifier and control block formats used when a data packet is to be transferred between two processing elements of the computer of FIG. 2. The structure for implementing this transfer is described below in connection with FIG. 26.

(11) Input/Output Transfer (IOT)

FIG. 16 illustrates the specifier, control block, and I/O buffer table formats for input and output transactions over 16 I/O channels. A specifier relates to an input or output transaction in an indicated channel according to whether it designates an operand or a result. The mode option is only two bits wide. Therefore, the two bits used to indicate IOT mode cannot be the first two bits of any other mode option, which is acceptable since only 6 options are needed. If the specifier is an operand-spec, then the buffer memory entry for the indicated channel is read, and the instruction specified by the acknowledge field is signaled when the buffer has been re-filled. If the specifier is a result-spec, then the buffer memory entry is written to, and the instruction specified is signaled when the buffer has been emptied. The channel buffer memory is part of the instruction execution control system and contains all necessary information to preclude any delay in the operation of the execution system pending completion of an I/O wait.

(VIII) Instruction Set and Operation—Enable Component

The encoding of the enable portion of the instructions will now will be described. The enable portion of an instruction includes a signal list field, a count field, and a reset field. The signal lists are stored in distribution memory 154; the count and reset fields are held in 3-bit count registers 153 and 3-bit reset registers 155, which together constitute an indicator memory 152. In one form, the distribution memory consists of 16-bit words and includes a base or header region having one storage location for each dataflow instruction, and an extension region containing blocks of successive words that hold the remainder of signal lists for which one word is insufficient. The formats for the words making up signal lists are given in FIGS. 17 through 23 and described below. Each word may be thought of as a specialized instruction to the signal system controller which either specifies a dataflow instruction to be signalled or specifies where to find and how to process the remaining words of the signal list. In the word formats, "instruction index" means the index of an instruction to be signalled, "jump address" means the address in the distribution memory of the next signal list word to be interpreted, "instruction reference" means a 7-bit field that specifies an instruction index relative to the "current base", and "condition" means a 4-bit field that specifies a boolean test on the (optional) condition code that accompanies the done signal of a dataflow instruction.

The signal list word formats are as follows:

(1) Normal Signal

As shown in FIG. 17, a Normal Signal word causes the instruction specified by the instruction index to be signalled. The 1-bit end field indicates whether or not this is the final word of a signal list.

(2) Short Signal

As shown in FIG. 18, a Short Signal word contains two instruction reference fields. Each of these fields is a 7-bit relative address, relative to the current base. An instruction reference can specify a target instruction that is up to ±63 bits away from the current base. The current base initially is the index of the instruction associated with the signal list being processed. A zero in either "Instruction Reference" field of a Short Signal word marks the end of the signal list.

(3) Change Base

A Change Base word causes redefinition of the current base. When processing of the signal list of a dataflow instruction is begun, the current base is the index of that dataflow instruction. When a Change Base word in a signal list is interpreted, the current base is set to the instruction index in the word. The effect of this action is that the reference fetch commands of succeeding Short Signal words are taken relative to the newly specified region of dataflow instructions. The base region the distribution memory contains one word for each of the 4096 instructions held by a processing element. Three of the word formats can be used in the base region: Normal Signal; Short Signal; and Jump.

(4) Jump

As shown in FIG. 20, the Jump word, which is here specified to have a 13 bit address field, instructs the signal system controller to take the next control word from the location in the distribution memory specified by the Jump address.

(5) Conditional Jump

As shown in FIG. 21, a Conditional Jump word allows a jump to be conditioned on the completion cod generated by a dataflow instruction. The following table specifies the tests on arithmetic results corresponding to the 16 possible codes in the cond field of the Conditional Jump words. If the completion code for the current dataflow instruction matches the test, then the next signal list word interpreted is the one at the Jump location in the distribution memory.

|   | Code | | | | |
|---|---|---|---|---|---|
|   | a | b | c | d | Meaning |
| a = error | 0 | 0 | 0 | 0 | negative zero |
| b = neg/pos | 0 | 0 | 0 | 1 | negative over-range |
| c = large/small | 0 | 0 | 1 | 0 | negative normal |
| d = over;under/ | 0 | 0 | 1 | 1 | negative under-range |
| normal;zero | 0 | 1 | 0 | 0 | positive zero |
|   | 0 | 1 | 0 | 1 | positive over-range |
|   | 0 | 1 | 1 | 0 | positive normal |
|   | 0 | 1 | 1 | 1 | positive under-range |
|   | 1 | 0 | 0 | 0 | propagated error |
|   | 1 | 0 | 0 | 1 | unknown value |
|   | 1 | 0 | 1 | 0 | zero-divide |
|   | 1 | 0 | 1 | 1 | unused |
|   | 1 | 1 | 0 | 0 | " |
|   | 1 | 1 | 0 | 1 | " |
|   | 1 | 1 | 1 | 0 | " |
|   | 1 | 1 | 1 | 1 | " |

The jump rel field is an 8-bit field that specifies a distribution memory location up to ±127 locations away from the address of the current word. (6) Skip As shown in FIG. 22, a Skip word contains a 4-bit Mask field and a 4-bit Sense field. This word causes $$x = \text{Mask} \cap (\text{sense} \oplus \text{cc})$$

to be evaluated, where cc is the completion code of the current dataflow instruction. If $x = 000_2$, the word immediately after the Skip word is interpreted next. If $x \neq 000_2$, the next word is skipped and the following word is interpreted next. If the end field is 1, interpretation of the signal list is terminated following interpretation of the word immediately following the Skip word (if it is interpreted at all), otherwise immediately.

(7) Dispatch

As shown in FIG. 23, a Dispatch word signals an instruction in a group of two, four, eight, or sixteen target instructions at consecutive indices. The control field specifies that one, two, three or four bits of the completion code are to be used to determine the dataflow instruction to be signalled. The selected bits from the completion code are added to a base index to obtain the index of the instruction to be signalled. The base index is equal to the current base.

Figure 26:
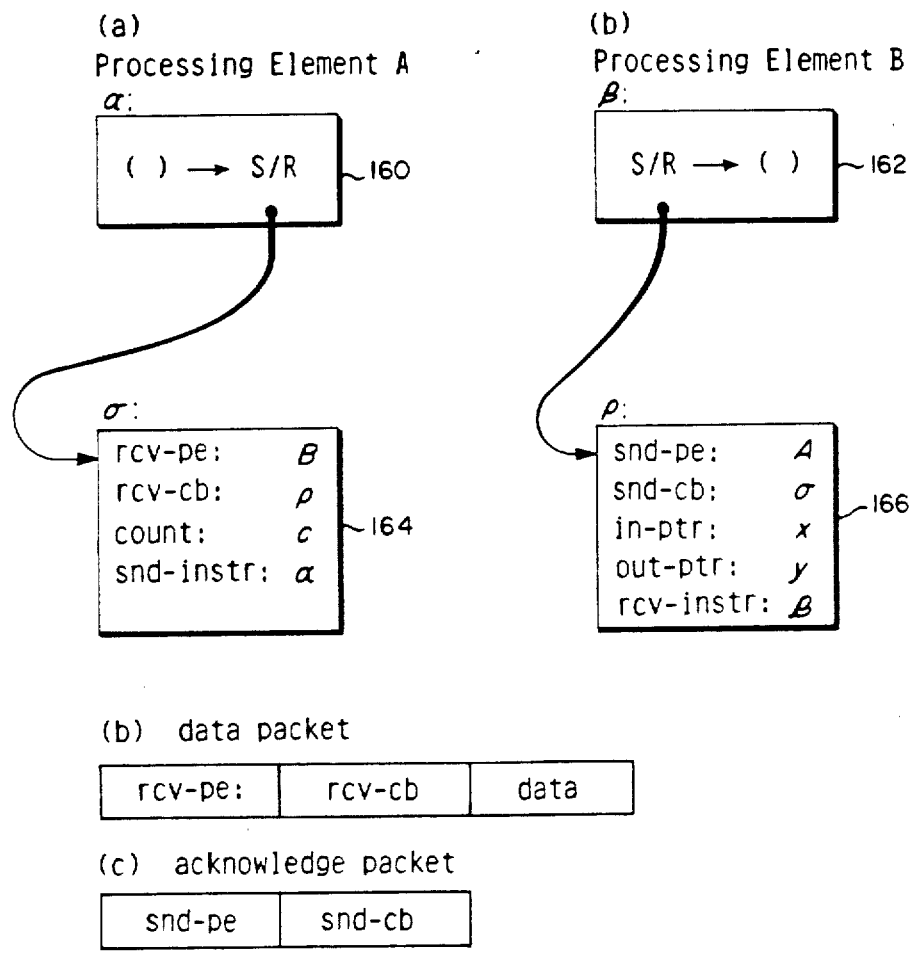
FIG. 26 illustrates interprocessor communication in the computer of FIG. 2 in accordance with the present invention.

(IX) Interprocessor Communication—FIG. 26

It is desirable to support a high rate of data transmission between two dataflow instructions, even when they reside in different processing elements. The preferred embodiment of the present invention includes an efficient mechanism for implementation of such transmission. This mechanism, which is now to be described in connection with FIG. 26, permits an instruction in processing element A to send several data packets to an instruction in processing element B before requiring a returned acknowledgement indication from processing element B. In this way, it is possible to achieve a higher transmission rate than would be possible if receipt of an acknowledge indication were necessary before another data packet could be sent. The mechanism allows processing element A to transmit up to some fixed number of data packets before receiving an acknowledge packet. It involves two instructions, one in processing element A and one in processing element B. The instruction in processing element A is a Send instruction 160 having an S/R result specifier; the instruction in processing element B is a Receive instruction 162 having one S/R operand specifier.

The nomenclature used in FIG. 26 and in the present description is as follows:

| | |
|---|---|
| rcv-pe | Receiving processing element number |
| snd-pe | Sending processing element number |
| rcv-cb | Specifier of control block in receiving processing element |
| snd-cb | Specifier of control block in sending processing element |
| snd-instr | Index of send instruction |
| rcv-instr | Index of receive instruction |
| count | Number of data packets sent but not acknowledged. |
| in-ptr | Input pointer for FIFO buffer in receiving processing element |
| out-ptr | Output pointer for FIFO buffer in receiving processing element. |

Associated with the Send instruction 160 is a control block 164 which contains a count item c. Receive instruction 162 has an associated control block 166 which contains a first index x (an In-pointer) and a last index y (an Out-pointer). Indices x and y refer to a buffer area in the data memory of processing element B. The mechanism controls the transmission of data packets from processing element A to processing element B and the transmission of acknowledge packets from processing element B to processing element A. As shown in FIG. 26b, the data packet fields include: a processing element number, a control block address, and a data value. The fields of an acknowledge packet include a processing element number and a control block address. There are four transactions that implement the protocol supported by this structure: the firing of the Send instruction; the firing of the Receive instruction; the action of signalling the Send instruction when processing element A receives an acknowledge packet; and the action of signalling the Receive instruction when processing element B receives a data packet. These transactions are described as follows:

(a) Firing the Send instruction: (1) send the data packet; (2) increment the count c by 1 modulo the buffer length; (3) if $c \neq 0$, signal the Send instruction (itself).

(b) Receipt of a data token (processing element B): (1) store the data value in the data memory at location x specified by the control block; (2) if $x = y$, send a signal to the Receive instruction of processing element B; (3) increment x by 1 modulo the buffer length.

(c) Firing the Receive instruction: (1) read the data item from the data memory at y as specified by the control block; (2) transmit an acknowledge packet containing the processing element number of the sending processing element and its control block address; (3) increment y by 1 modulo the buffer length; (4) if $x \neq y$, signal the Receive instruction (itself).

(d) Receipt of an acknowledge token (processing element A): (1) if $c = 0$, send a signal to the Send instruction; (2) decrement c by 1 modulo the buffer length.

Figure 24:
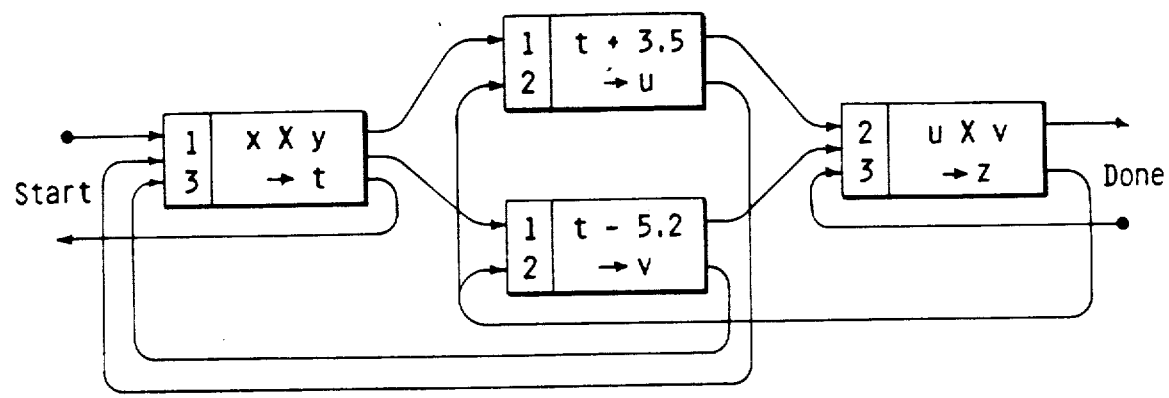
FIG. 24 illustrates dataflow instructions arranged for pipelined execution in accordance with the present invention.

(X) Pipelining in the Illustrated Embodiment—FIG. 24

Of great importance in the architecture of the present invention is pipelining—the processing of data by successive stages of a computing mechanism so that each stage is usefully busy in every cycle of operation. Pipelining is used in the high performance arithmetic units of conventional supercomputers where the stages are subcomponents of an arithmetic operation such as floating point addition or multiplication. When a computation is pipelined on a static dataflow computer, the stages of the pipeline are successive groups of nodes in a dataflow graph as illustrated in FIG. 24—that is, each stage comprises a set of perhaps many arithmetic operations. Note that, whereas the interconnection of stages is "hardwired" in the typical arithmetic unit, in a dataflow program these connections are the arcs between dataflow nodes that are part of the stored program.

In consequence of the rule that any arc of a dataflow graph can hold at most one token, pipelined operation is the natural mode of operation of dataflow graphs. Yet, to achieve the highest computation rate, every path through a dataflow graph must contain exactly the same number of nodes. A dataflow graph arranged to support this sort of pipelined behavior is said to be maximally pipelined. An acyclic dataflow graph can always be transformed into a maximally pipelined graph by the addition of identity actors. In a balanced graph, the nodes divide into stages such that every arc is incident on one node in each stage. Then all nodes in even stages may fire alternately with all nodes in odd stages, and each node fires as often as possible.

The instruction execution period places an upper bound on the computation rate of pipelined code. The rate cannot exceed the limit imposed by the tightest cycle in the machine code graph. FIG. 24 illustrates dataflow code for performing $$z := (x * y + 3.5) * (x * y - 5.2)$$

Every cycle is incident on two instructions, so that, given a computation rate of 50 kilohertz, each instruction may fire at most once every 20 microseconds. At this rate, a processing element holding 400 instructions in pipelined code is running at 20 mips. With half of these instructions as floating point operation, ten megaflops performance is achieved. Thus, as a practical matter, the computation rate is high.

(XI) Programming Example A

Figure 27:
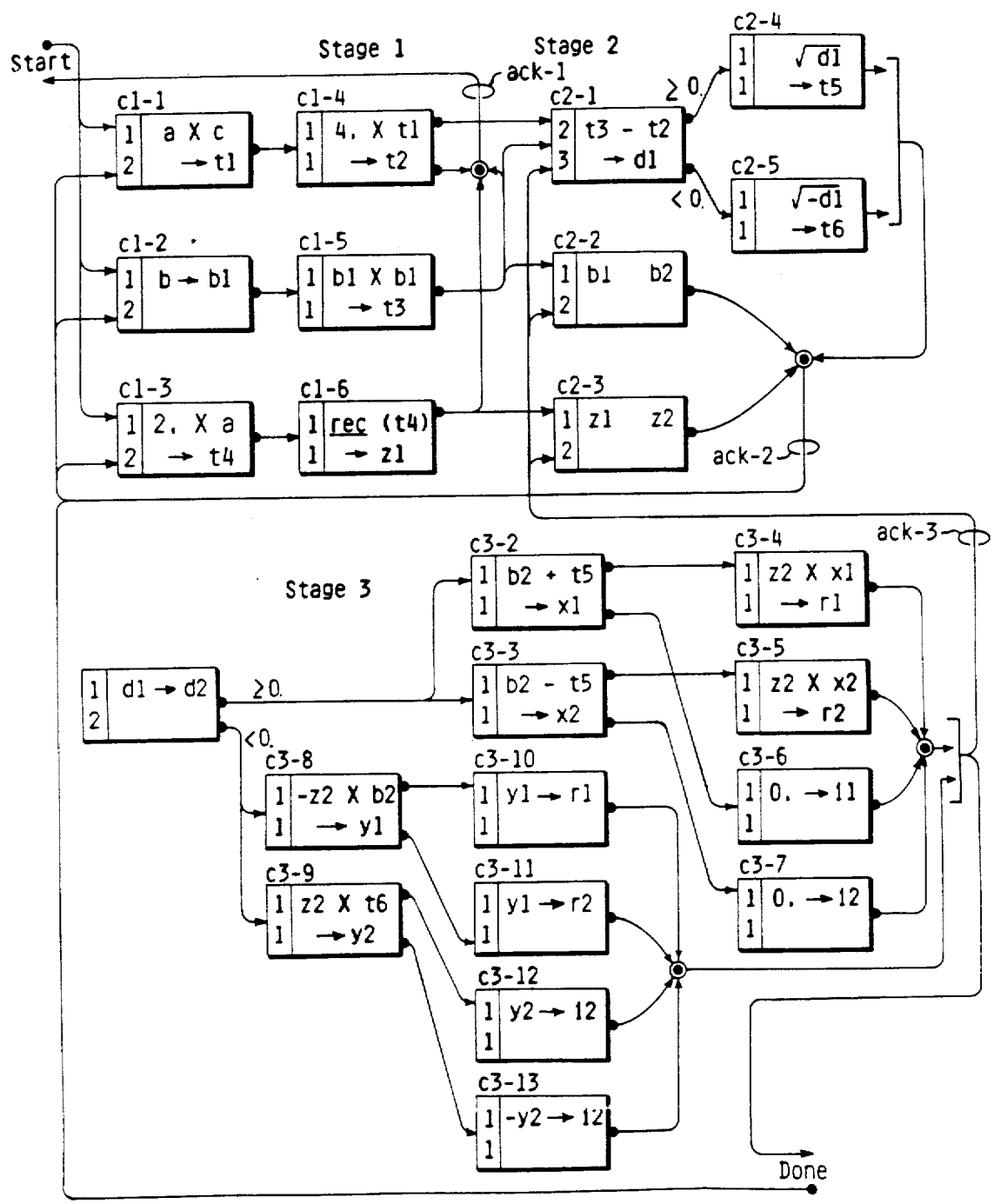
FIG. 27 illustrates dataflow machine code for the quadratic formula as an example in accordance with the present invention.

FIG. 27 shows dataflow machine code for the quadratic formula. A signal at Start means that locations a, b and c have been properly set. An acknowledge signal at Start means that the producer may set a, b and c again. The signalling at Done is similar. In the figure, a bracket indicates that signals are to be treated to implement the logic OR operation; a circled dot indicates treatment to implement the logic AND operation. This code can be understood by comparing it with the dataflow graph in FIG. 4, although there is a difference in that the gate and merge nodes in FIG. 27 do not appear as distinct instructions. Rather, the test of D is implemented by instruction c2-1, which commands the enable system to use one of two alternate signal lists according as $D \geq 0.0$ or $D < 0.0$. These lists serve to activate the instructions for one arm or the other of the conditional construction. Generally, the merge is implemented simply by having the instructions of each conditional arm—c3-4 through c3-7 for the TRUE arm and c3-10 through c-13 for the FALSE arm—write into the same location of data memory. Because skew in timing might lead one arm to write its result too early or too late yielding nondeterminate behavior, a second test of D, instruction c3-1, is included to ensure that the code is faithful to the dataflow graph. The outcome of the test is used to signal the cells that are next in line to write into the result locations.

In FIG. 27, acknowledge signals, ack-1, ack-2, ack-3 which indicate completion of the unit of work in each of the stages identified in the diagram. Signal ack-2, for example, tells Stage 3 to begin processing the work unit just completed by Stage 2, and also tells Stage 1 that it is permitted to begin processing its next work unit. This code is not maximally pipelined because the paths through each stage contain one, two, or three instructions instead of only one. Explanation of the maximally pipelined version of this code, which contains a large number of signal arcs that are somewhat difficult to comprehend, is not needed for a full understanding of the present invention.

Figure 28:
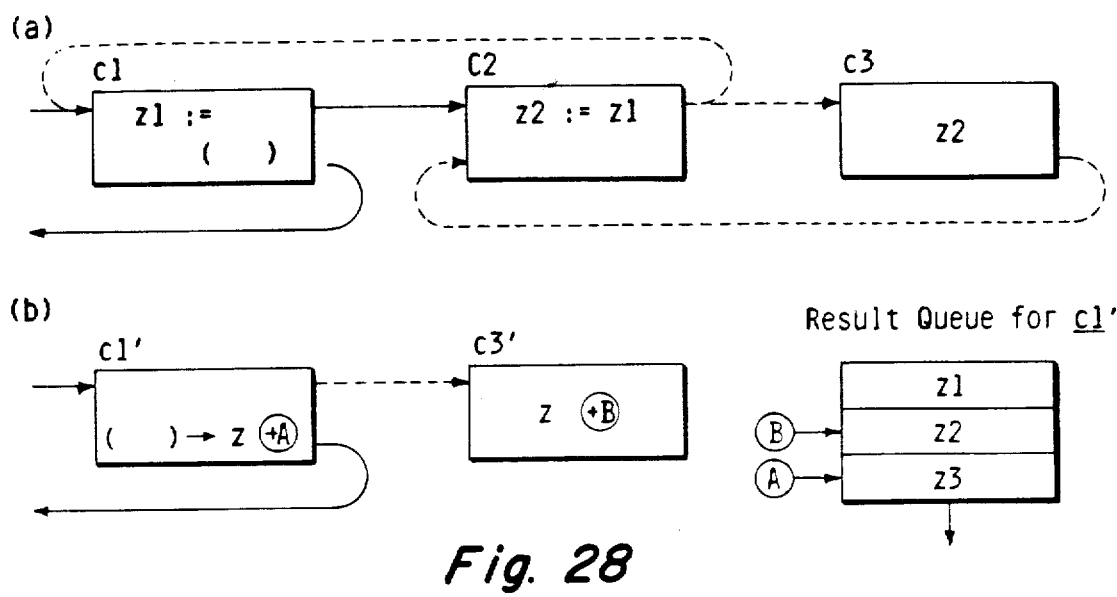
FIG. 28 illustrates result queueing in accordance with the present invention.

Instructions c2-2, c2-3 and c3-1 are "overhead" instructions, the primary function of which is to copy values generated by other instructions. These are included in the machine code to achieve a balanced pipeline configuration. The need for these overhead instructions is avoided by using the result queueing scheme of FIG. 28. In FIG. 28(a), instruction c2 serves as a buffer for the result of instruction c1 which permits execution of instruction c1 in order to permit execution of instruction c1 again before instruction c2 causes execution of instruction c3. The same advantage may be obtained by providing instruction c1 with a result queue as in FIG. 28(b). Instructions c1' and c3' use index counters Ⓐ and Ⓑ to address elements of the queue. The notation ⊕Ⓐ means that the index counter Ⓐ incremented by ONE before it is used to store or access an item in the queue. Note that, with just the signalling indicated in FIG. 28(b), counter Ⓑ never can advance beyond counter Ⓐ, so no element of the queue will be read before it is written. Although counter Ⓐ may advance arbitrarily far ahead of counter Ⓑ in principle, the code as a practical matter includes other constraints that limit this interval to a small integer. The result queue, in one form, is implemented as a ring buffer in the data memory of a processing element.

The use of this result queue structure eliminates three instructions from the machine code of FIG. 27. In this case, the code consists of twenty-one instructions of which fourteen are used by each work unit as it passes down the pipeline, and the average number of arithmetic operations performed per work unit is ten.

(XII) Programming Example B

Figure 29:
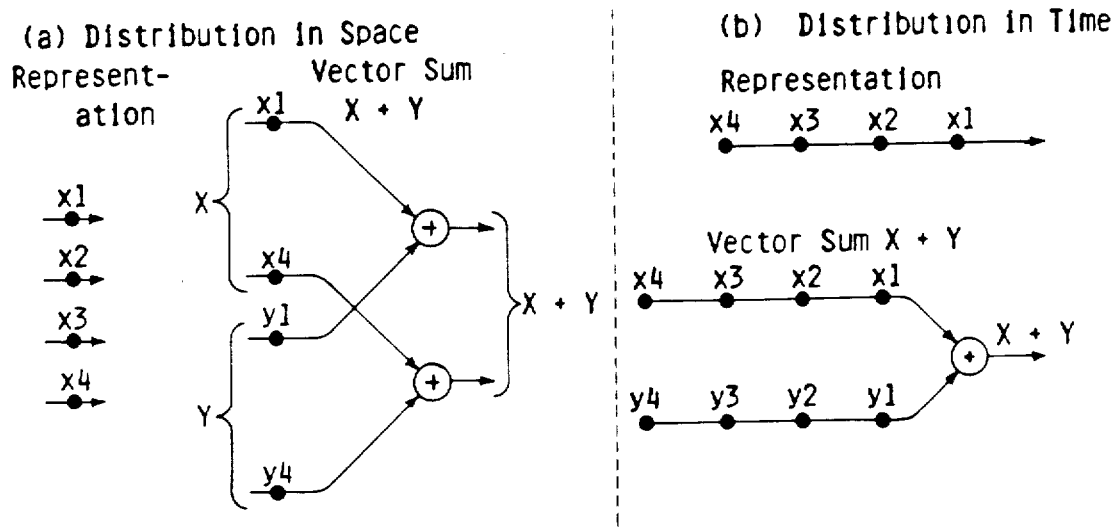
FIG. 29 illustrates alternative representations of array values in accordance with the present invention.

Large scale scientific computation generally involves large arrays of data. The efficient processing of large volumes of data in this form is supported by the dataflow computer of the present invention. In dataflow computation, it is not satisfactory to view arrays, as in Fortran, as a set of values occupying successive locations in a memory. Two alternative views useful in dataflow computation are illustrated in FIG. 29. In one view, an array is regarded as a set of scalar values carried simultaneously by several dataflow arcs, the array being distributed in space. In the other view, an array is regarded as a set of successive values carried by tokens traversing a single dataflow arc, the array being distributed in time. The choice between distributing in space or in time is an important consideration in the design of a compiler for matching parallelism in an algorithm to the parallelism supportable by the target computer. In many large scale codes, the parallelism available in the algorithm is so great that distributing most arrays in time is necessary to achieve balanced use of machine resources.

Figure 30:
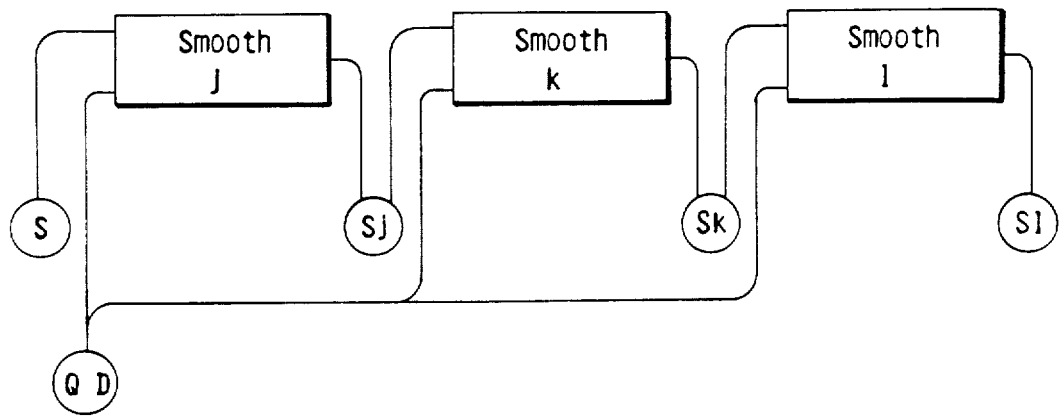
FIG. 30 illustrates the phases of smoothing operations in connection with use of array memories in accordance with the present invention.

The following example shows how dataflow machine code in the form of pipelined code effective by implements a process that consumes data from one or more large multidimensional arrays and generates a large multidimensional array as its result. The example is Smooth, a module from an aerodynamic simulation code. It accounts for about five percent of all arithmetic operations performed in a run of the complete code. This example uses a cubical grid divided into 128 intervals along each of three coordinate directions. Five physical quantities are associated with each of the $128 \times 128 \times 128$ grid points. The purpose of Smooth is to produce new data for the grid by applying a smoothing formula to sets of adjacent points. To compute the new data for point (l,k,j) the old values at distances $\pm 2$, $\pm 1$, and 0 parallel to one of the coordinate axes are used in a weighted sum. Simpler formulas are used at the boundaries. The smoothing process is carried out as a separate computation for each direction, each computation using the result of the previous computation, as illustrated in FIG. 30.

The Val program of FIG. 31 defines the smoothing process for the coordinate associated with index j, and for just one of the five physical quantities. This program makes good use of the Val forall construct, which defines a new array value in terms of existing value definitions. For example, the element-by-element sum of two vectors may be written as forall i in [1,n]construct A[i]+B[i] endall When considering how the Smooth module may be implemented as a machine code for static dataflow supercomputer, an immediate observation is that the amount of data involved is very large, much too large to be held in the data memories of the processing elements. Moreover the program modules that perform the smoothing operation in the two other directions need access to the data in a different order, at least if the formulas are to be effectively pipelined. For this reason, each module must generate and store its results completely before the next module may begin. A local array memory, a large and therefore slower memory than the data memory, is associated with each processing element to hold large data objects such as the arrays of intermediate data needed in this example.

Figure 32:
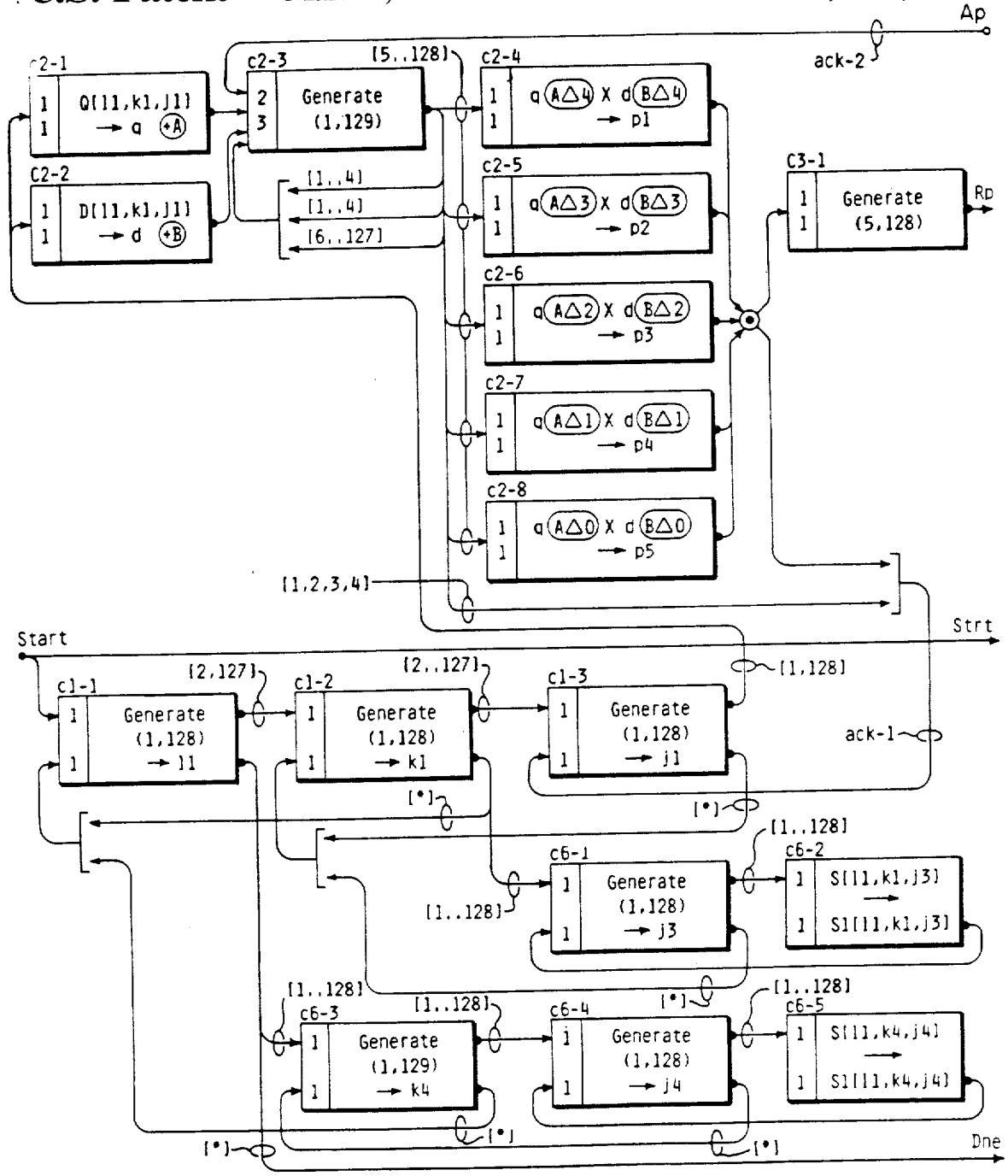
FIGS. 32 and 33 illustrate dataflow machine code for the smoothing function of FIG. 31.
Figure 33:
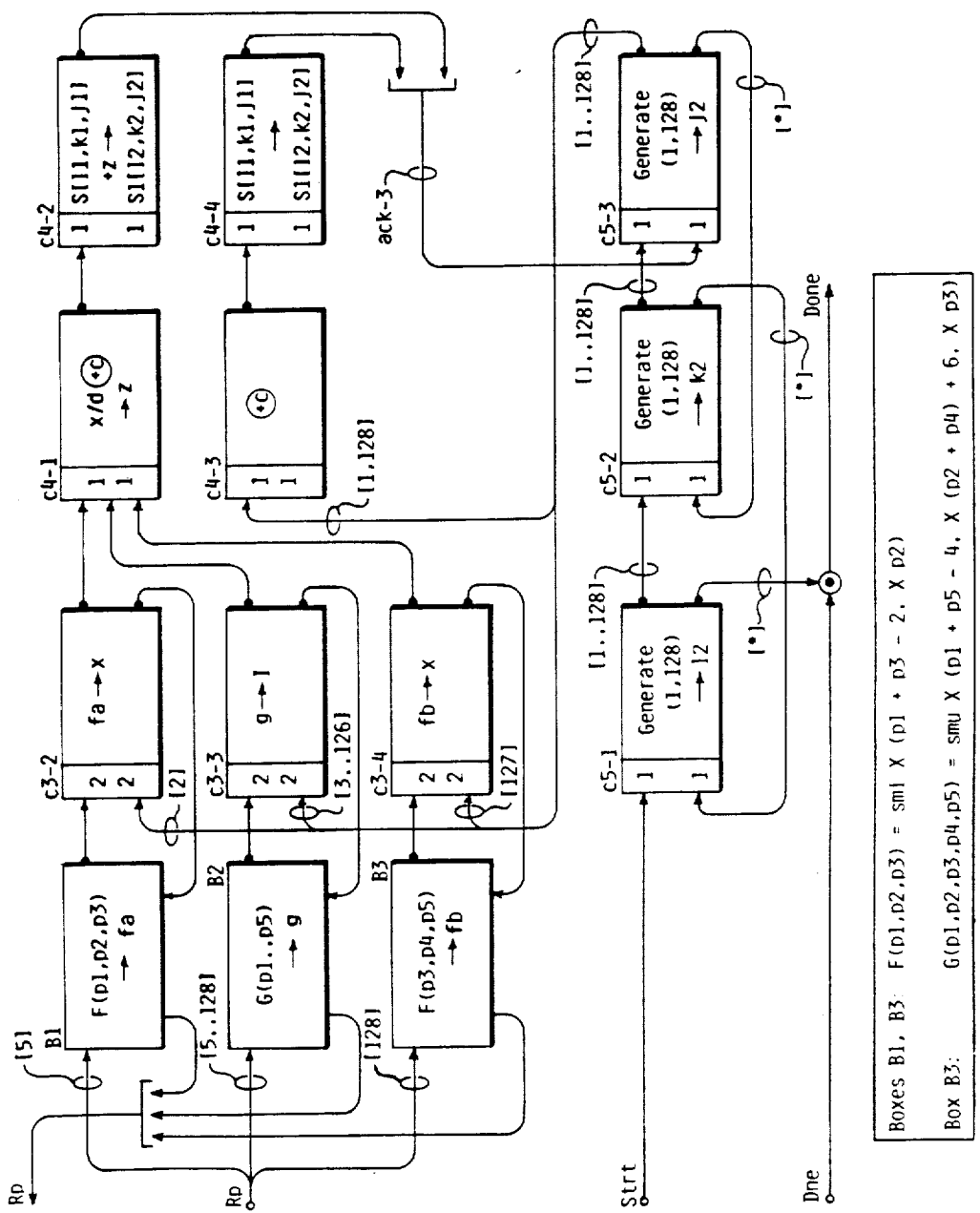

A dataflow machine program for the Smooth module is shown in FIGS. 32, 33. In successive executions, the instruction Generate(a,b) produces internally the sequence of integers starting with "a" and ending with "b"; following this sequence of executions, it produces the symbol * on its next execution; this cycle is repeated endlessly thereafter. The signal list of a Generate instruction may condition transmission of signals on properties of the integer values it produces, or on the presence or absence of the symbol *. For example, a signal arc labelled [5 . . . 128] sends a signal if the integer generated is in the indicated range. The set notation {1,2} is used to specify that the target instruction is to be signalled if the integer belongs to the set. Some instructions call for accessing operand values from array memory, or storing result values in array memory.

An overview of the operation of this code is as follows: Three of the Generate instructions on the left set indices l1, k1, and j1 to successive points of the grid with j1 being the fast index. Array memory fetch instructions c2-1 and c2-2 move elements of input data arrays Q and D into result queues in data memory. Note that the generate instruction c2-3 waits for five values to enter each of the result queues before signalling the product instructions c2-4, . . . , c2-8. In the product instructions, the notation ⟨A A⟩ means that the element four items earlier than the one at Ⓐ in the result queue is to be read. This accomplishes the desired offset addressing so that all five product terms may be computed at once. The three boxes B1, B2 and B3 contain the instructions for evaluating the two body expressions F and G—two copies of F and one copy of G. Box B1 handles only element 2 of each row; box B2 handles elements 3 through 126, and box B3 handles element 127. FIG. 34 shows how the signalling arrangement ensures that each of these boxes receives the correct product values.

Instructions c3-2, . . . , c3-4 and the Generate instruction c5-3 implement the determinate merging of results of the conditional arms. Instructions c4-1 and c4-2 perform the final computation steps and store the results in the array memory. Instructions c4-3 and c4-4 store values of the end elements of each row. To remain in step, each of the three index counters Ⓐ, Ⓑ, and Ⓒ must be stepped the same number of times in the processing of each row; so extra steps must be inserted where data items held in a result queue are not referenced. Thus instruction c4-3 is included to step counter Ⓒ for elements 1 and 128 of the D array produced by instruction c2-2. The three generate instructions on the right are needed to ensure that the Done signal is not sent before all result values have been stored safely away in the array memories. The remaining instructions on the left, c6-1 through c6-5, store old data values in the boundary elements of the new array, as called for the Val program.

Determining the amount of data memory required for the two result queues involves the following considerations. For values of q produced by instruction c2-1, five locations are necessary and sufficient because, once the first five values have been produced, the signalling allows further values to be produced only as queue elements are released by firings of the product cells. In determining the size of the result queue for instruction c2-2, it is necessary to determine how many values of d may be produced in advance of their use by instruction c4-1. The Petri net of FIG. 35 is helpful in making this evaluation. Each transition models the execution of the indicated instruction in FIGS. 32, 33, and the placement of tokens corresponds to the initial count and reset values in the machine code. (The number of transitions used to represent box B2 reflects the depth of the expression for G which is four.) Examination of the Petri net shows that transition c2-2 can fire at most seven times before the first firing of c4-1 and, therefore, that a queue of seven elements is sufficient.

To complete this discussion of the Smooth module, consider its performance parameters in reference to possible full performance of a dataflow computer with 256 processing elements. For the smoothing of all five physical quantities of the problem, the counts of arithmetic operations and array memory read/write operations are as follows (the Jacobian array D need be read only once):

| adds | multiplies | divides | reads | writes |
|------|------------|---------|-------|--------|
| $25n^3$ | $40n^3$ | $5n^3$ | $11n^3$ | $5n^3$ |

Since three data memory cycles are required for each arithmetic operation, the ratio of data memory accesses to array memory accesses is $(3\ 70)/16 = 13.1$. The processing element architecture of FIGS. 1 and 5 incorporates structure that corresponds to this design consideration.

The rate at which instructions in the machine code can fire is controlled by the most restrictive cycle in the graph. There are three cycles of size four instructions in the dataflow graph, as shown in FIG. 36. These cycles involve Generate instructions, result queue manipulation, and array memory accesses, as well as arithmetic operations. Ordinarily, the most limiting cycle is Cycle 3 since it contains a division and also a read/write of the array memory. The time span for execution of an instruction has two parts, that due to the enable system and that due to the execution system. The former component ordinarily depends on how many enabled instructions are available to a processing element, and the latter component depends on the complexity of the instruction executed. The following calculation is based on a cycle time of 30 microseconds for Cycle 3 and the assumption that this cycle determines the rate of computation. The total number of arithmetic operations performed for each work unit entering the pipeline is 70. In an embodiment having a repetition cycle of 30 microseconds duration, these instructions can support $70/(30 \times 10^{-6}) = 2.3$ million operations per second, not enough to keep one processing element busy, let alone 256. The solution to this mismatch is to use many copies of the code. The use of four copies in each processing element supports $4 \times 2.33 = 9.32$ megaflops of performance for each processing element, which is close to the peak performance of the machine.

What is claimed is:

1. Data processing means for effecting data processing transactions according to programs of instructions including predecessor-successor pairs of instructions, a predecessor instruction having one or more successor instructions, a successor instruction having one or more predecessor instructions, said instruction having indices, said data processing means comprising:
   (a) first means for effecting the transaction of instruction execution components specifying operands and operators to produce execution results pertaining to further operands and operators, and execution completion signals pertaining to said execution results;

(b) second means for effecting the transaction of instruction enable components specifying instruction execution sequencing to produce enable events pertaining to further instruction execution sequencing, and enable completion signals pertaining to said enable events;

(c) associations of said execution components and said enable components, and associations of said execution completion signals and said enable completion signals having associations of indices corresponding to said instruction indices;

(d) third means for the transmission of said enable completion signals from said second means to said first means, and for the transmission of said execution completion signals from said first means to said second means;

(e) a transaction of a given execution component and a transaction of a given enable component occurring respectively in said first means and said second means, said given execution component and said given enable component having associated indices corresponding to a given instruction index;

(f) a transaction of a given instruction being conditioned on the occurrence of completion signals generated by the transaction of certain predecessor and successor instructions of said given instruction;

(g) transactions of said execution components subject to said enable completion signals, and transactions of said enable components subject to said execution completion signals being overlapped to occur freely and concurrently with respect to each other.

2. The data processing means of claim 1 wherein an enable signal consists of a reference to an instruction index and a done signal consists of a reference to an instruction index and at least one member of the class consisting of condition codes and the null code, said condition codes being members of the class consisting of a few Boolean properties and logical combinations thereof, said Boolean properties being properties of the execution transaction which generated said last mentioned done signal.

3. The data processing means of claim 1 wherein said instruction execution components are characterized by a first operand address specifier, a second operand address specifier and a result address specifier.

4. The data processing means of claim 1, said first means being an execution system including execution memory means, arithmetic/logic means, and execution control means, said second means being an enable system including enable memory means and enable control means, said enable memory means including indicator memory means and distribution memory means, said execution control means and said enable control means being operatively connected for communication therebetween of enable completion signals and execution completion signals, said enable completion signals and said execution completion signals including instruction index specifiers.

5. The data processing means of claim 1 wherein said instruction execution components include opcodes and at least a member of the class consisting of data constants, input data address specifiers and output data address specifiers.

6. The data processing means of claim 1 wherein the data includes input data having operand values and output data characterized by members of the class consisting of result values and result conditions.

7. The data processing means of claim 4 wherein said execution memory means stores instruction execution components at locations corresponding to instruction index specifiers and operands at locations corresponding to operand address specifiers.

8. The data processing means of claim 4 wherein an instruction execution transaction includes retrieval of an instruction execution component and corresponding input data from locations in said execution memory means, execution of an instruction execution component by said arithmetic/logic means to produce output data, and storage of output data in locations in said execution memory means.

9. The data processing means of claim 4 wherein said execution control means is responsive to an enable completion signal to cause an instruction execution transaction, and, after completion thereof, to cause generation of an execution completion signal.

10. The data processing means of claim 4 wherein said indicator memory means includes count registers and reset registers.

11. The data processing means of claim 10 wherein said count registers and said reset registers, respectively for a given instruction, provide a current enable count that records completions of executions of related predecessor and successor instructions, and a reset enable count that restores a given register to reset condition when a given instruction has been selected for execution.

12. The data processing means of claim 4 wherein the instruction enable component of an instruction includes instruction index specifiers of one or more of its successor instructions.

13. The data processing means of claim 12 wherein said distribution memory means stores lists of said instruction index specifiers, a given one of said lists pertaining to a given one of said successor instructions.

14. The data processing means of claim 4 wherein said enable control means, on occurrence of one or more enable conditions for one or more enabled instructions, causes selection of an enabled instruction and generation of an enable completion signal referring to the instruction index specifier of said enabled instruction.

15. The data processing means of claim 4 wherein said enable control means, on receipt of an instruction completion signal, causes reference thereto in said indicator memory in correspondence with certain of the instruction index specifiers of successor instructions of said enabled instruction.

16. The data processing means of claim 1 wherein a processing transaction includes generation of an enable completion signal following occurrence of an enable condition, an arithmetic/logic transaction to generate an execution completion signal, and indication thereof in said indicator memory means.

17. A computer for effecting data processing transactions according to programs of instructions including predecessor-successor pairs of instructions, a predecessor instruction having one or more successor instructions, a successor instruction having one or more predecessor instructions, said instructions having indices, said computer comprising (A) a plurality of processing element means, (B) a plurality of array memory means, (C) a plurality of data path means, and (D) routing network means; each of said processing element means comprising:
- (a) first means for effecting the transaction of instruction execution components specifying data and data operators to produce execution results pertaining to further data and data operators, and execution completion signals pertaining to said execution results;
- (b) second means for effecting the transaction of instruction enable components specifying instruction execution sequencing to produce enable events pertaining to further instruction execution sequencing, and enable completion signals pertaining to said enable events;
- (c) associations of said execution components and said enable components, and associations of said execution completion signals and said enable completion signals having associations of indices corresponding to said instruction indices;
- (d) third means for the transmission of said enable completion signals from said second means to said first means, and for the transmission of said execution completion signals from said first means to said second means;
- (e) a transaction of a given execution component and a transaction of a given enable component occurring respectively in said first means and said second means, and given execution component and said given enable component having associated indices corresponding to a given instruction index;
- (f) a transaction of a given instruction being conditioned on the occurrence of completion signals generated by the transaction of certain predecessor and successor instructions of said given instruction;

given ones of said processing element means and given ones of said array memory means transmitting data and data operators therebetween only via given ones of said data path means, any one of said processing element means and any other of said processing element transmitting data and data operators therebetween via said routing network.

18. The computer of claim 17 wherein said first means is an execution system including execution memory means, arithmetic/logic means, and execution control means, said second means is an enable system including enable memory means and enable control means, said enable memory means including indicator memory means and distribution memory means, said execution control means and said enable control means being operatively connected for communication therebetween of enable completion signals and execution completion signals, said enable completion signals and said execution completion signals including instruction index specifiers.

19. The computer of claim 18 wherein said instruction execution components include opcodes and at least a member of the class consisting of data constants, input data address specifiers and output data address specifiers.

20. The computer of claim 19 wherein an enable signal consists of a reference to an instruction index and a done signal consists of a reference to an instruction index and at least one member of the class consisting of condition codes and the null code, said condition codes being members of the class consisting of a few Boolean properties and logical combinations thereof, said Boolean properties being properties of the execution transaction which generated said last mentioned done signal.

21. The computer of claim 20 wherein said execution memory means stores instruction execution components at locations corresponding to instruction index specifiers and operands at locations corresponding to operand address specifiers.

22. The computer of claim 21 wherein an instruction execution transaction includes retrieval of an instruction execution component and corresponding input data from locations in said execution memory means, execution of an instruction execution component by said arithmetic/logic means to produce output data, and storage of output data in locations in said execution memory means.

23. A dataflow processing element for effecting processing element transactions on data according to programs of instructions, selected predecessor-successor pairs of instructions being related by functional dependencies, a predecessor instruction having one or more successor instructions, a successor instruction having one or more predecessor instructions, said processing element comprising:
- (a) execution system means including execution memory means, arithmetic/logic means, and execution control means; and
- (b) enable system means including enable memory means and enable control means, said enable memory means including indicator memory means and distribution memory means;
- (c) said execution control means and said enable control means being operatively connected for communication therebetween of fire commands and done commands; said fire commands being transmitted from said enable control means to said execution control means, and said done commands being transmitted from said execution control means to said enable control means, said instructions including instruction execution components and instruction enable components, instructions being identified by instruction indices; said fire commands and done commands including instruction index specifiers;
- (d) said instruction execution components including opcodes and data address specifiers including input data address specifiers and output data address specifiers; input data including operand values and output data characterized by result values and result conditions; said execution memory means storing instruction execution components at locations corresponding to instruction index specifiers and data, including input data and output data, at locations corresponding to input data address specifiers and output data address specifiers;
- (e) an instruction execution transaction including retrieval of an instruction execution component and corresponding input data from locations in said execution memory means, execution of an instruction execution component by said arithmetic/logic means to produce output data, and storage of output data in locations in said execution memory means;
- (f) said execution control means being responsive to a fire command to cause an instruction execution transaction, and, after completion thereof, indication of a result condition, to cause generation of a done command;
- (g) said indicator memory means including indicators corresponding to instruction indices for cumulatively recording occurrences of done commands corresponding to instruction indices, an enable condition being established by said indicators for an instruction when said indicator memory means has indicated the occurrences of done commands for predecessor instructions thereof as determined by said result conditions of said predecessor instructions as transmitted by said done commands;

(h) the instruction enable component of an instruction including instruction index specifiers of one or more of its successor instructions, said distribution memory means storing said instruction enable components;

(i) said enable control means, on occurrence of at least one enable condition for at least one enabled instruction, causing selection of an enabled instruction and generation of a fire command containing the instruction index specifier thereof; said enable control means, on receipt of a done command, causing indication thereof in indicators selected by said distribution memory means in correspondence with certain of the instruction index specifiers of successor instructions of said enabled instruction;

(j) a processing element transaction including generation of a fire command following occurrence of an enable condition, an arithmetic/logic transaction to generate a done command, and indication thereof in said indicator memory means, said processing element transactions occurring at times that are arbitrary with respect to a given order of said instruction indices.

24. A computer for effecting data processing transactions according to programs of instructions including selected predecessor-successor pairs of instruction, a predecessor instruction having one or more successor instructions, a successor instruction having one or more predecessor instructions, said instructions having indices, said computer comprising (A) a plurality of processing element means, (B) a plurality of array memory means, and (C) routing network means;

(I) each of said processing element means comprising
   (a) execution system means including execution memory means, arithmetic/logic means, and execution control means;
   (b) enable system means including enable memory means and enable control means, said enable memory means including indicator memory means and distribution memory means;
   (c) said execution control means and said enable control means being operatively connected for communication therebetween of fire commands and done commands; said fire commands being transmitted from said enable control means to said execution control means, and said done commands being transmitted from said execution control means to said enable control means; said instructions including instruction execution components and instruction enable components, instructions being identified by instruction indices; said first commands and done commands including instruction index specifiers;
   (d) said instruction execution components including opcodes and data address specifiers including input data address specifiers and output data address specifiers; input data including operand values and output data including at least a member of the class consisting of result values and result conditions; said execution memory means storing instruction execution components at locations corresponding to instruction index specifiers and data including input data and output data at locations corresponding to input data address specifiers and output data address specifiers;
   (e) an instruction execution transaction including retrieval of an instruction execution component and corresponding input data from locations in said execution memory means, execution of an instruction execution component by said arithmetic/logic means to produce output data, and storage of output data in locations in said execution memory means;
   (f) said execution control means being responsive to a fire command to cause an instruction execution transaction, and, after completion thereof, indication of a result condition, to cause generation of a done command;
   (g) said indicator memory means including indicators corresponding to instruction indices for cumulatively indicating occurrences of done commands corresponding to instruction indices, an enable condition being established by said indicators for an instruction when said indicator has indicated the occurrences of done commands for predecessor instructions thereof as determined by said result conditions of said predecessor instructions as transmitted by said done commands;
   (h) the instruction enable component of an instruction including instruction index specifiers of one or more of its successor instructions, said distribution memory means storing said instruction enable components;
   (i) said enable control means, on establishment of one or more enable conditions for one or more enabled instructions, causing selection of an enabled instruction and generation of a fire command containing the instruction index specifier thereof; said enable control means, on receipt of a done command, causing indication thereof in indicators selected by said distribution memory means in correspondence with certain of the instruction index specifiers of successor instructions of said enabled instruction;
   (j) a processing element transaction including generation of a fire command following occurrence of an enable condition, an arithmetic/logic transaction to generate a done command, and indication thereof in said indicator memory means, said processing element transactions occurring at times that are arbitrary with respect to a given order of said instruction indices;

(II) given ones of said processing element means and given ones of said array memory means transmitting packets of data to each other only via said routing network means, any one of said processing element means and any other of said processing element means transmitting instruction execution components therebetween via said routing network.

25. A data processing method for effecting data processing transactions according to programs of instructions including predecessor-successor pairs of instructions, predecessor instruction having one or more successor instructions, a successor instruction having one or more predecessor instructions, said instruction having indices, said data processing method comprising the steps of:

(a) transacting in a first means instruction execution components specifying operands and operators to produce execution results pertaining to further operands and operators, and execution completion signals pertaining to said execution results;

(b) transacting in a second means instruction enable components specifying instruction execution sequencing to produce enable events pertaining to further instruction execution sequencing, and enable completion signals pertaining to said enable events;

(c) said transacting steps including the steps of selecting associations of said execution components and aid enable components, and associations of said execution completion signals and said enable completion signals having associations of indices corresponding to said instruction indices;

(d) transmitting said enable completion signals from said second means to said first means, and transmitting said execution completion signals from said first means to said second means;

(e) transacting a given execution component and transacting a given enable component respectively in said first means and said second means, said given execution component sand said given enable component having associated indices corresponding to a given instruction index; and (f) a transaction of a given instruction being conditioned on the occurrence of completion signals generated by the transaction of certain predecessor and successor instructions of said given instruction.

26. Data processing means for effecting data processing transactions according to programs of instructions, said data processing means comprising:

(a) execution means for effecting execution transactions and enable means for effecting enable transactions;

(b) said instructions having instruction indices, and including (1) execution specifiers having execution indices and (2) enable specifiers having enable indices, certain of said enable specifiers referring to a plurality of instruction indices;

(c) given instruction indices corresponding to given associations of execution indices and enable indices;

(d) completions of execution transactions causing transmissions of done signals from said execution means to said enable means;

(e) completions of enable transactions causing transmissions of fire signals from said enable means to said execution means;

(f) said enable means being responsive to sets for said done signals for performing enable transactions according to said enable specifiers to determine sets of said fire signals;

(g) said execution means being responsive to sets of said fire signals to perform execution transactions according to said execution specifiers on functional sets of operators and operands, said execution transactions determining sets of said done signals;

(h) the occurrence of a particular fire signal being conditioned on the reception by the enable means of at least one of said done signals, each of which corresponds to an enable specifier that refers to the instruction index associated with said particular fire signal.

27. The data processing means of claim 26 wherein one of said done signals includes at least one member of the class consisting of condition codes and the null code, said condition codes being members of the class consisting of a few Boolean properties and logical combination thereof, said Boolean properties being properties of the execution transaction which generated said one of said done signals.

28. The data processing means of claim 26 wherein said execution means includes execution memory means, arithmetic/logic means, and execution control means, said execution control means effecting the transaction of execution specifiers designating operands and operators to produce execution results pertaining to further operators and operands.

29. A computer for effecting data processing transactions according to programs of instructions, said computer comprising (A) a plurality of processing element means, and (B) routing network means;

(I) each of said processing element means comprising:

(a) execution means for effecting execution transactions and enable means for effecting enable transactions;

(b) said instructions having instruction indices, and including (1) execution specifiers having execution indices and (2) enable specifiers having enable indices, certain of said enable specifiers referring to a plurality of instruction indices;

(c) given instruction indices corresponding to given associations of execution indices and enable indices;

(d) completions of execution transactions causing transmissions of done signals from said execution means to said enable means;

(e) completions of enable transactions causing transmissions of fire signals from said enable means to said execution means;

(f) said enable means being responsive to sets of said done signals for performing enable transactions according to said enable specifiers to determine sequence of said execution transactions:

(g) said execution means being responsive to sequences of said fire signals to perform execution transactions according to said execution specifiers on functional sets of operators and operands, said execution transactions determining sets of said done signals;

(h) the occurrence of a particular fire signal being conditioned on the reception by the enable means of at least one of said done signals, each of which corresponds to an enable specifier that refers to the instruction index associated with said particular fire signal.

(II) sets of said processing element means transmitting packets of data to each other via said routing network means, said packets of data referring to said instruction execution components, said enable components and said operands.

30. Data processing means for effecting data processing transactions according to programs of instructions, said data processing means comprising:

(a) execution means for effecting execution transactions and enable means for effecting enable transactions, completions of execution transactions causing transmission of done signals from said execution means to said enable means, completions of enable transactions causing transmission of fire signals from said enable means to said execution means;
(b) said instructions including execution specifiers and enable specifiers, aid execution specifiers having execution indices and said enable specifiers having enable indices, given associations of execution indices and enable indices constituting given instruction indices;
(c) said enable means being responsive to sets of said done signals for performing enable transactions according to said enable specifiers, said execution means being responsive to sets of said fire signals to perform execution transactions according to said execution specifiers on sets of operators and operands;
(d) the occurrence of a particular fire signal being conditioned on the reception by the enable means of at least one of said done signals, each of which corresponds to an enable specifier that refers to the instruction index associated with said particular fire signal.

* * * * *